US010347298B2

(12) United States Patent
Curcio et al.

(10) Patent No.: US 10,347,298 B2
(45) Date of Patent: Jul. 9, 2019

(54) METHOD AND APPARATUS FOR SMART VIDEO RENDERING

(71) Applicant: Nokia Technologies Oy, Espoo (FI)

(72) Inventors: Igor Danilo Diego Curcio, Tampere (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 333 days.

(21) Appl. No.: 14/304,856

(22) Filed: Jun. 13, 2014

(65) Prior Publication Data
US 2015/0078723 A1 Mar. 19, 2015

(30) Foreign Application Priority Data

Jun. 21, 2013 (IN) .......................... 2696/CHE/2013

(51) Int. Cl.
G11B 27/22 (2006.01)
G11B 27/034 (2006.01)
(Continued)

(52) U.S. Cl.
CPC ............ *G11B 27/22* (2013.01); *G11B 27/034* (2013.01); *G11B 27/11* (2013.01); *G11B 27/28* (2013.01);
(Continued)

(58) Field of Classification Search
CPC ............ H04N 9/87; H04N 5/77; H04N 7/181; H04N 9/802; H04N 21/44008;
(Continued)

(56) References Cited

U.S. PATENT DOCUMENTS 5,963,203 A * 10/1999 Goldberg ............ G06F 17/3079
707/E17.028
5,978,519 A 11/1999 Bollman et al.
(Continued)

FOREIGN PATENT DOCUMENTS

WO 1998/047084 A1 10/1998
WO 1999/001830 A1 1/1999
WO 2014/096502 A1 6/2014

OTHER PUBLICATIONS

"Condition One", Retrieved on Jul. 3, 2014, Webpage available at : http://www.conditionone.com/.
(Continued)

Primary Examiner — Thai Q Tran
Assistant Examiner — Syed Y Hasan
(74) Attorney, Agent, or Firm — Alston & Bird LLP

(57) ABSTRACT

A method generating control data for displaying a video sequence on a low resolution display may comprise providing at least a first video sequence, the first video sequence comprising a plurality of image frames, determining whether a first image frame of the first video sequence comprises a sub-image of a primary object, selecting a first position of a primary image portion of an image frame such that the first position substantially matches with the position of the sub-image of the primary object, if the first image frame has been determined to comprise said sub-image of said primary object and providing control data, which indicates said first position.

19 Claims, 19 Drawing Sheets

(51) Int. Cl.
*G11B 27/11* (2006.01)
*G11B 27/28* (2006.01)
*G11B 27/34* (2006.01)
*H04N 5/77* (2006.01)
*H04N 5/225* (2006.01)
*H04N 5/235* (2006.01)
*H04N 7/18* (2006.01)
*H04N 9/80* (2006.01)
*H04N 9/87* (2006.01)
*H04N 9/802* (2006.01)

(52) U.S. Cl.
CPC .............. *G11B 27/34* (2013.01); *H04N 5/77* (2013.01); *H04N 9/802* (2013.01); *H04N 9/87* (2013.01); *H04N 5/2355* (2013.01); *H04N 7/181* (2013.01)

(58) Field of Classification Search
CPC .. H04N 1/2125; H04N 5/23229; G11B 27/22; G11B 27/34
USPC ....... 386/223, 224, 240, 248, 278, 241, 326; 345/419; 725/723, 976; 348/61, 231.3, 348/222.1
See application file for complete search history.

(56) References Cited

U.S. PATENT DOCUMENTS

| | | | |
|---|---|---|---|
| 6,442,538 B1 | 8/2002 | Nojima | |
| 7,471,827 B2 | 12/2008 | Xie et al. | |
| 7,529,390 B2 | 5/2009 | Zhang et al. | |
| 7,916,971 B2 | 3/2011 | Bigioi et al. | |
| 8,180,157 B2 | 5/2012 | Grosvenor | |
| 8,271,919 B2 | 9/2012 | Ikawa | |
| 8,665,345 B2 * | 3/2014 | Karn ................... | G11B 27/24 348/222.1 |
| 2007/0076979 A1 | 4/2007 | Zhang et al. | |
| 2009/0153654 A1 * | 6/2009 | Enge ................... | G06K 9/00624 348/61 |
| 2011/0018868 A1 * | 1/2011 | Inoue ................... | A63F 13/10 345/419 |
| 2011/0107279 A1 | 5/2011 | Ikawa | |
| 2012/0019837 A1 | 1/2012 | Nakata et al. | |
| 2012/0134648 A1 | 5/2012 | Miura et al. | |
| 2012/0198337 A1 | 8/2012 | Flint et al. | |
| 2013/0081082 A1 | 3/2013 | Riveiro Insua et al. | |
| 2013/0259447 A1 * | 10/2013 | Sathish ................... | H04N 9/87 386/278 |

OTHER PUBLICATIONS

Extended European Search Report received for corresponding European Patent Application No. 14171866.8, dated Dec. 26, 2014, 8 pages.

Barreiro-Megino et al., "Visual Tools for ROI Montage in an Image2Video Application", IEEE Transactions on Cicuits and Systems for Video Technology, vol. 19, No. 12, Dec. 2009, pp. 1927-1932.

* cited by examiner

METHOD AND APPARATUS FOR SMART VIDEO RENDERING

FIELD

Some versions may relate to providing a video sequence. Some versions may relate to displaying a video sequence.

BACKGROUND

The resolution of a video sequence may be e.g. 1280×960 pixels. The video sequence may be displayed by a display, which has a lower resolution, e.g. 640×480 pixels. Traditionally, the video sequence is converted from a higher resolution to a lower resolution so that it can be displayed on the display. The converted video sequence may be provided by downsampling (i.e. downscaling), e.g. by combining four input pixels into a single output pixel.

SUMMARY

Some versions may relate to a method for providing a video sequence. Some versions may relate to method for displaying a video sequence. Some versions may relate to an apparatus for providing a video sequence. Some versions may relate to an apparatus for displaying a video sequence. Some versions may relate to a computer program for providing a video sequence. Some versions may relate to a computer program for displaying a video sequence. Some versions may relate to a computer program product storing a computer program for providing a video sequence. Some versions may relate to a computer program product storing a computer program for displaying a video sequence.

According to a first aspect, there is provided a method, comprising:
  providing at least a first video sequence, the first video sequence comprising a plurality of image frames,
  determining whether a first image frame of the first video sequence comprises a sub-image of a primary object,
  selecting a first position of a primary image portion of an image frame such that the first position substantially matches with the position of the sub-image of the primary object, if the first image frame has been determined to comprise said sub-image of said primary object, and
  providing control data, which indicates said first position.

According to a second aspect, there is provided a method, comprising:
  obtaining one or more video sequences, which comprise a plurality of image frames,
  obtaining control data which indicates the position of a primary portion of a first image frame, and
  displaying the primary portion of the first image frame on a display based on the control data.

According to a third aspect, there is provided an apparatus comprising at least one processor, a memory including computer program code, the memory and the computer program code configured to, with the at least one processor, cause the apparatus to perform at least the following:
  provide at least a first video sequence, the first video sequence comprising a plurality of image frames,
  determine whether a first image frame of the first video sequence comprises a sub-image of a primary object,
  select a first position of a primary image portion of an image frame such that the first position substantially matches with the position of the sub-image of the primary object, if the first image frame has been determined to comprise said sub-image of said primary object, and
  provide control data, which indicates said first position.

According to a fourth aspect, there is provided an apparatus comprising at least one processor, a memory including computer program code, the memory and the computer program code configured to, with the at least one processor, cause the apparatus to perform at least the following:
  obtain one or more video sequences, which comprise a plurality of image frames,
  obtain control data which indicates the position of a primary portion of a first image frame, and
  display the primary portion of the first image frame on a display based on the control data.

According to a fifth aspect, there is provided a computer program comprising computer program code configured to, when executed on at least one processor, cause an apparatus or a system to:
  obtain at least a first video sequence, the first video sequence comprising a plurality of image frames,
  determine whether a first image frame of the first video sequence comprises a sub-image of a primary object,
  select a first position of a primary image portion of an image frame such that the first position substantially matches with the position of the sub-image of the primary object, if the first image frame has been determined to comprise said sub-image of said primary object, and
  provide control data, which indicates said first position.

According to a sixth aspect, there is provided a computer program product embodied on a non-transitory computer readable medium, comprising computer program code configured to, when executed on at least one processor, cause an apparatus or a system to:
  obtain at least a first video sequence, the first video sequence comprising a plurality of image frames,
  determine whether a first image frame of the first video sequence comprises a sub-image of a primary object,
  select a first position of a primary image portion of an image frame such that the first position substantially matches with the position of the sub-image of the primary object, if the first image frame has been determined to comprise said sub-image of said primary object, and
  provide control data, which indicates said first position.

According to a seventh aspect, there is provided a means for generating control data, the means for generating comprising:
  means for obtaining at least a first video sequence, the first video sequence comprising a plurality of image frames,
  means for determining whether a first image frame of the first video sequence comprises a sub-image of a primary object,
  means for selecting a first position of a primary image portion of an image frame such that the first position substantially matches with the position of the sub-image of the primary object, if the first image frame has been determined to comprise said sub-image of said primary object, and
  means for providing control data, which indicates said first position.

A video sequence captured by a camera may be displayed on a display, which is remote from the camera. The resolution of the display may be lower than the resolution of the video sequence. The native resolution of the display may be lower than the resolution of video sequence. The native resolution of the display may be lower than the resolution of image sensor of the camera that captured the video sequence.

A part of the image frames of the video sequence may be temporarily hidden based on relative importance of objects appearing in the image frames. Secondary portions of the image frames may be temporarily discarded based on the relative importance of objects appearing in the image frames. The relative importance of objects appearing in the image frames may be determined e.g. by utilizing context information, e.g. size of the objects, depth of the objects in a scene, information about the geographical location of a first camera unit or information about the presence of other camera units near the first camera unit. The relative importance of objects appearing in the image frames of a video sequence may be determined e.g. by an analysis unit, which may be configured to determine whether one or more objects appearing in the image data captured by the camera substantially match with reference image data. The reference image data may contain e.g. images of persons of interest and/or objects of interest.

In an embodiment, the relative importance of objects appearing in the image frames of a video sequence may be determined e.g. by utilizing reference data obtained from one or more other camera units, which are close to the first camera unit. An analysis unit may be configured to determine whether image data captured by the camera substantially matches with the reference image data.

A display device may be configured to display only a primary portion of an image frame, based on video control data, which is transmitted to the display device. Secondary portions of the image frames may be discarded based on the video control data. In an embodiment, the primary image portion may cover e.g. less than 70% of the pixels of an image frame. In an embodiment, the primary image portion may cover e.g. less than 70% of the width of an image frame.

A video sequence may be provided such that said video sequence is associated with video control data, which indicates the positions of primary portions of image frames of the video sequence. The video control data may be determined such that the primary portions corresponding to the video control data contain one or more sub-images of primary objects. Primary objects may also be called e.g. as objects of interest (OOI).

A display may be subsequently configured to display only the primary portion, according to the video control data. In an embodiment, the display may be configured to display only primary portions, instead of displaying whole image frames.

A user of a display device may preserve full freedom to choose whether he wishes to view the full image frames of the original video sequence or only the primary portions of the image frames, as indicated by the control data. The user may enable operation of the display device e.g. in a first operating mode or in a second operating mode. The first operating mode may be called e.g. as a "smart rendering mode", and the second operating mode may be called e.g. as a "normal operating mode". In the smart rendering mode, the primary portions of the image frames may be displayed according to the control data. In the normal operating mode, the full image frames of the original video sequence may be displayed.

The control data may be generated by using context data, which may indicate e.g. a distance between an object and a camera device during capturing one or more video sequences of an event. The control data may be shared with other users that have access to said video sequences.

In an embodiment, a high resolution video sequence may be subsequently displayed e.g. on a low-resolution display such that the primary portion is still shown with high resolution, wherein a secondary image portion outside the primary portion is effectively discarded. Thus, a viewer may perceive the details of the primary object even in a situation where a high amount of the original image information of the video sequence is not displayed on the display. The details of the primary object may be reproduced without smoothing out the details (without blurring) even when the resolution of the display would be lower than the resolution of the video sequence.

In an embodiment, a video sequence may be subsequently displayed on a display with a resolution that is lower than or equal to the resolution of the video sequence. The primary portion may be shown, wherein the secondary image portion may be effectively discarded. Thus, a viewer may perceive the details of the primary object in a more pronounced manner, since a high amount of the original image information of the video sequence is not displayed on the display. The pronounced displaying of primary objects may offer an opportunity to convey different views of the scene from the same original video sequence.

The control data may comprise for one or more temporal intervals of the video:
  data for indicating the positions of the primary portions,
  data for indicating the size or sizes of the primary portions,
  data for indicating the aspect ratio or aspect ratios of the primary portions,
  data for controlling reproducing sounds, and/or
  data for controlling video effects.

The control data may indicate e.g.:
  the position of a primary portion,
  the size of the primary portion,
  the aspect ratio of the primary portion,
  operating instructions for a situation where the aspect ratio of the display is different from the aspect ratio of the primary portion (i.e. whether clipping or black regions should be used),
  operating instructions for a situation where resolution of the display screen is different from the "native" resolution of the primary portion, and/or
  display-specific data for rendering with various different resolutions.

The control data may also be called e.g. as a rendering template (RT). The control data may be stored and/or transferred as meta-information associated with one or more video sequences. The control data may also be called e.g. as a "meta-information rendering template" (MRT). The control data MRT may comprise the video control data. In an embodiment, the control data MRT may comprise video control data and audio control data. A media file may comprise a video sequence, audio data, context data and control data MRT. The control data MRT may be included e.g. as metadata in the media file. The video control data may be stored and/or transmitted together with the video sequence. A media file may be stored in a memory and/or transmitted e.g. via the Internet such that the media file contains the video sequence and the video control data MRT.

In an embodiment, the control data may be associated with a single video sequence and with a single audio track. In this case, the control data may be called e.g. as single track audio single track video meta-information rendering template (ST-MRT).

In an embodiment, the control data may be generated and/or used e.g. for smart rendering of multi-view multi-channel multimodal content. The control data may be associated with two or more video sequences and with two or more audio tracks. In this case, the control data may be called e.g. as multi track audio multi track video meta-information rendering template (MT-MRT).

A media system may comprise:
- a media recording module (MRM) for recording a video sequence and an audio signal,
- a context recording module (CRM) for providing context data, and
- a rendering analysis engine (RAE) for generating control data by using the recorded video sequence and by using the context data.

The video sequence, the audio signal, and the context data may be time-aligned, i.e. they may represent the same event, which takes place during a certain time period. The recorded data may be time-stamped in order to allow temporal synchronization.

In an embodiment, the control data may comprise different data elements optimized for display devices having different capabilities. The control data may comprise a first data element for indicating the position and size of the primary portion of a first image frame when displayed on a first display, which has a first native resolution, and the control data may comprise a second data element for indicating the position and size of the primary portion of the first image frame when displayed on a second display, which has a second native resolution, which is different from the first native resolution. The first native resolution may be e.g. 1280×720 pixels, and the second native resolution may be e.g. 1920×1080 pixels. The resolution of the first image frame may be e.g. 2560×1600 pixels.

Controlling displaying according to the control data may provide improved user experience, e.g. when compared with simple downscaling of resolution.

Controlling displaying according to the control data may provide optimal rendering of content on devices with smaller displays. Controlling displaying according to the control data may provide a possibility to optimize rendering options for devices with different form factors and/or with different rendering profiles.

In an embodiment, a display device may be configured to display a video sequence according to the control data also in a situation where the control data indicates the size of the primary portion, wherein the indicated size of the primary portion is different from the native resolution of the display device. The resolution of the primary portion may be optionally up-scaled or downscaled, depending on the properties of the display. In other words, the primary portion does not need to be shown with the original resolution. If needed, the resolution of the primary portion may be upscaled or downscaled to match with the native resolution of the display device. For example, the size of a primary portion may be e.g. 400×300 pixels, and the native resolution of the display screen may be e.g. 640×480 pixels. In this example, the resolution of the primary portion may be upscaled for displaying said primary portion on said display.

In an embodiment, a display device may be configured to display a video sequence according to the control data also in a situation where the control data indicates the aspect ratio of the primary portion, wherein the indicated aspect ratio of the primary portion is different from the aspect ratio of the display device. If needed, one or more filling portions (e.g. black areas) may be added to the sides of the primary portion so that the aspect ratio of the displayed images may match with the aspect ratio of the display. If needed, a central part of the primary portion may be displayed such that an upper and/or a lower part of the primary portion are not displayed. If needed, a central part of the primary portion may be displayed such that a left part and/or a right part of the primary portion are not displayed. For example, the size of a primary portion may be e.g. 500×350 pixels, and the native resolution of the display screen may be e.g. 1280×720 pixels. In this example, the resolution of the primary portion may be upscaled for displaying said primary portion on said display. Filling portions may be added to the sides of the primary portion and/or a part of the primary portion may be temporarily hidden in order to adjust the aspect ratio.

Multi-track audio visual representations may be customized and shared with control data such that the size (i.e. memory consumption) of the control data is very small when compared with the size of the video data of said representation. Original image frames of a video sequence may have been already transmitted from a server to a display device, and the display device may be configured to display a modified presentation video sequence without the need to transmit modified image frames from the server to the display device. The presentation video sequence may be modified without the need to store the modified image frames in the memory of the server. The presentation video sequences may be generated and displayed frame by frame at the display device. The presentation video sequence may be modified without the need to simultaneously store several modified image frames in a memory of the display device. Original image frames and/or control data may be distributed by one or more servers, which may have a low storage capacity. Control data for displaying customized presentation video sequences may be obtained even from a high number of users without permanently altering the image frames of the original content. This may be useful for solutions that aim to reduce the size of data storage on a server or on a portable device.

The video control data may be generated e.g. by analyzing the relative importance of candidate objects appearing in the captured video sequence. Generating the video control data may comprise determining whether a candidate object appearing in an image frame is a primary object. The control data may be generated by an analysis device or by a user. In an embodiment, the position of a primary portion may be determined e.g. by using context data. The control data may be generated from one or more video sequences based on context data associated with said video sequences. The context data may comprise e.g. information about the location and/or orientation of a camera. The context data may comprise e.g. information derived from the operating environment of the camera.

A first video sequence may be captured by using a first camera unit, and a second video sequence may be captured by using a second camera unit. An object may be classified to be a primary object e.g. when the object appears in both video sequences related to the same event. The video control data may be subsequently determined such that the primary portion of at least one image frame of the first video sequence comprises a sub-image of the primary object. An object may be classified to be a primary object e.g. when the object appears in at least two video sequences related to the same event. An object may be classified to be a primary object e.g. when the object appears in all video sequences related to the same event. The first video sequence and a second video sequence may be determined to relate to the same event based on context data. The context data may indicate e.g. that the first camera unit is located in the vicinity of a second camera unit. Information contained in the second video sequence may be determined to be relevant with respect to the first video sequence based on the context data.

In an embodiment, several video sequences may be captured by using several camera units, which are located near each other. The context data may indicate that the video sequences captured by the camera units relate to the same event. When the video sequences are determined to relate to the same event, the video sequences may be analyzed in order to determine whether a candidate object appears in the majority of the captured video sequences. A candidate object appearing in the majority of the captured video sequences may be classified to be a primary object. The video control data may be determined such that the primary portion of at least one image frame of the first video sequence comprises a sub-image of the primary object. For example, a red-haired person appearing in the majority of the captured video sequences may be classified to be a primary object, whereas a dark haired person appearing in only one video sequence may be classified to be of secondary importance.

A first candidate object may appear in a first video sequence captured by a first camera unit located at a first view point, and a second candidate object may appear in a second video sequence captured by a second camera unit located at a second view point. In an embodiment, a three dimensional (3D) model of a candidate object may be created based on one or more captured video sequences. For example, the first candidate object may be represented by a point cloud. The 3D model of the first candidate object may be compared with sub-images of the image frames of the second video sequence in order to determine whether the first candidate object substantially matches with the sub-images of the second video sequence. Said comparison may be performed e.g. when the context data indicates that the first video sequence and the second video sequence relate to the same event. In an embodiment, the first candidate object may be classified as a primary object when the 3D model of the first candidate object substantially matches with at least one sub-image of the second video sequence A candidate object may be classified to be a primary object e.g. when the candidate object substantially matches with one of the objects specified in a list of primary objects. However, the group of "important" objects may sometimes be too large in order to carry out reliable and/or fast image recognition. For example, a first list of primary objects may contain all important tourist attractions in the world (e.g. the Statue of Liberty in New York, the Eiffel Tower in Paris, the painting of Mona Lisa in Paris, or the Big Ben clock tower in London, etc.). The number of primary objects of the first list may be so high that comparing the captured video sequence with the images of the primary objects becomes slow and/or unreliable. A reduced second list of primary objects may be formed from the first list by using context data. For example, a video sequence may be captured by using a camera unit, which is detected to be located in Paris, and the second list may be limited to objects located in Paris. The second list of primary objects may be limited based on the geographical location of the camera unit. The second list of primary objects may be formed e.g. such that it contains tourist attractions (i.e. primary objects) of Paris. Comparison of the video sequence with objects of the second list may be faster and/or more reliable than in case of the first list. A candidate object may be classified to be a primary object e.g. when the candidate object substantially matches with one of the objects specified in the second list of primary objects. The list of primary objects may be limited based on context data. In particular, the list of primary objects may be limited based on detected geographical location of a camera unit.

Reference data for determining the relative importance of objects may be retrieved e.g. from the Internet, based on the detected location of the camera. For example, a video sequence may be captured by a camera, which is detected to be located in the city of "Paris". Reference image data from one or more objects of interest (OOI) associated with the location "Paris" may be retrieved from the Internet. For example, an image of the Eiffel tower may be retrieved when the camera is detected to be located in Paris. An image frame may comprise a sub-image of a candidate object. For example, an image frame may comprise a first sub-image of a first candidate object (e.g. a tower) and a second sub-image of a second candidate object (e.g. a bridge). An analysis unit may be configured to determine whether a sub-image of an image frame captured by the camera substantially matches with the reference image data. The analysis unit may be configured to determine whether the candidate object is a primary object by comparing captured image data with the reference image data. For example, the first candidate object may be determined to be a primary object when the captured sub-image of the tower matches with the image of the Eiffel tower.

One or more video sequences of an event may be associated with a multi-channel audio signal. The video sequences may be associated with an audio control data. The audio control data (e.g. audio scene zoom information) may be generated such that audio rendering may be spatially correlated with visual rendering. The audio control data may be generated e.g. based on the positions of the primary portions, based on information about the orientation of the camera during capturing the video sequence, and based on the positions of the microphones used for recording the multi-channel audio signal. Sounds which do not originate from a zone or a sector corresponding to the primary portion may be suppressed. Reproduction of sounds may be controlled based on the position of the sub-image of a primary object in an image frame. Reproduction of sounds may also be controlled based on the distance between a camera and said primary object, if said information about said distance is available. The sounds may be reproduced according to the audio control data such that sounds which do not originate from the sector corresponding to a primary portion may be suppressed. The audio control data may comprise audio zoom control data. The angular width of said sector may be adjusted based on the audio zoom control data.

In an embodiment, a point cloud may be generated from the recorded video sequence. The point cloud may be subsequently compared with geo-spatial data that may be available locally or in a network cloud (e.g. from the Internet) to estimate the location and the orientation of the camera unit (i.e. camera pose estimate CPE). A list of primary objects may be retrieved e.g. from an Internet server based on the camera pose estimate. Candidate objects appearing in the video sequence may be compared with objects of said list in order to determine whether one or more of said candidate objects are primary objects. The position of the primary portion may be determined such that the primary portion covers the sub-images of the primary objects. In other words, the presence of significant points of interest or landmarks may be used to determine the position of the sub-resolution window that is used for rendering and inclusion in the MRT. For example, the position of the primary portion may be determined such that it comprises the maximum amount of landmark or POIs with highest priority for rendering.

In an embodiment, the control data MRT may also contain effects control data, which may specify effects, which may be implemented when displaying the video sequence. The effects control data may specify rendering information i.e. the run-time effects that may be included while rendering a portion of the image. For example, the effects control data may specify that rendering of a given frame portion may be preceded with a zooming effect. For example, the effects control data may specify that rendering of a given frame portion may be succeeded with a fade-out effect.

BRIEF DESCRIPTION OF THE DRAWINGS

In the following examples, several variations will be described in more detail with reference to the appended drawings, in which.

DETAILED DESCRIPTION

Figure 1:
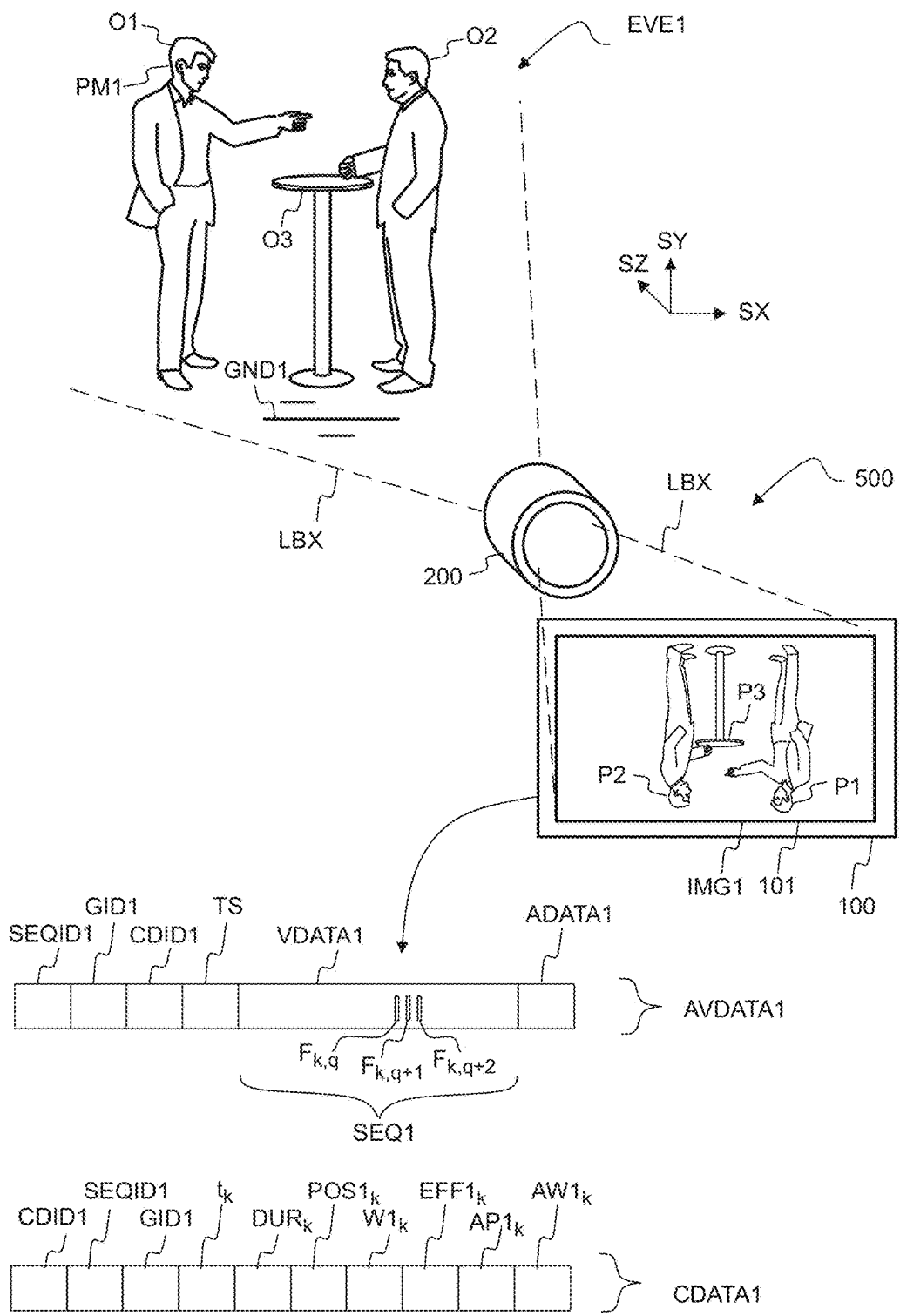
FIG. 1 shows, by way of example, capturing a video sequence of an event.

Referring to FIG. 1, a video sequence SEQ1 of an event EVE1 may be captured by using an image sensor 100. Imaging optics 200 may be arranged to focus light LBX reflected from objects O1, O2, O3 to the image sensor 100. The imaging optics 200 may be arranged to form an optical image IMG1 on the image sensor 100. The image sensor 100 may have an active area 101. The image sensor 100 may be configured to convert the optical image IMG1 into a digital image $F_{k,q}$. The digital image may be called e.g. as an image frame $F_{k,q}$. The image frame $F_{k,q}$ may comprise images P1, P2, P3 of the objects O1, O2, O3. The images of the objects may also be called as sub-images P1, P2, P3. The image sensor 100 may provide a video sequence SEQ1, which may comprise several consecutive image frames $F_{k,q-1}$, $F_{k,q}$, $F_{k,q+1}$, $F_{k,q+2}$, $F_{k,+3}$, . . . . The video sequence SEQ1 may be stored and/or transferred as video data VDATA1. The video data VDATA1 may be optionally associated with audio data ADATA1. The video data VDATA1 may be optionally associated with a sequence identifier SEQID1. The identifier SEQID1 may be e.g. a unique code ("name"), which distinguishes the video sequence from other video sequences, which have been captured by other devices and/or which represent other events.

The identifier SEQID1 may comprise e.g. a uniform resource locator (URL) and/or a uniform resource identifier (URI), which may identify a resource, which contains the video data VDATA1. The uniform resource locator (URL) may also be called e.g. as the web address.

In the example, a first object O1 may be e.g. the face of a first person, a second object O2 may be e.g. the face of a second person, and a third object may be e.g. a table.

The video data VDATA1 may be optionally associated with a control data identifier CDID1. The identifier CDID1 may be e.g. a code, which identifies control data CDATA1 associated with the video data VDATA1 In an embodiment, the identifier CDID1 may comprise e.g. a uniform resource locator (URL) and/or a uniform resource identifier (URI), which may identify a resource, which contains the control data CDATA1.

The video data VDATA1 may be optionally associated with a time stamp TS, which may indicate when the video sequence was captured. The time stamp TS may indicate e.g. a time associated with the beginning of a video sequence.

In an embodiment, the video data VDATA1 may be optionally associated with a group identifier GID1. Several video sequences of the event EVE1 may be captured by using several different devices, and the video sequences may be collectively identified by the group identifier GID1. In an embodiment, the group identifier GID1 may be e.g. a unique code. The group identifier GID1 may comprise e.g. a uniform resource locator (URL) and/or a uniform resource identifier (URI), which may identify a resource, which contains the relevant video sequences. The group identifier GID1 may comprise e.g. a uniform resource locator (URL) and/or a uniform resource identifier (URI), which may identify a resource, which in turn may identify the relevant video sequences.

One or more objects O1, O2, O3 may be moving during an event EVE1. An object (e.g. the object O1) may move with respect to the ground GND1 and/or with respect to other objects O2, O3.

The video data VDATA1 may be associated with control data CDATA1. The control data CDATA1 may comprise position data $POS1_k$, which indicates the position of a primary portion POR1. The control data CDATA1 may optionally comprise time data $t_k$ associated with the position data $POS1_k$.

The control data CDATA1 may optionally comprise time period data $DUR_k$ associated with the time data $t_k$. The time period data $DUR_k$ may also be replaced or supplemented by indicating an ending time (i.e. the time data associated with the last image frame). The time period data $DUR_k$ may also be replaced or supplemented e.g. by indicating second time data $t_{k+1}$ (see e.g. FIG. 4a).

The control data CDATA1 may optionally comprise size data $W1_k$, which may specify e.g. the width of the primary portion POR1 or the total number of pixels of the primary portion POR1. The control data CDATA1 may optionally comprise effect data $EFF1_k$. The control data CDATA1 may optionally comprise audio zone position data $AP1_k$ and/or audio zone size data $AW1_k$. The control data CDATA1 may optionally comprise the control data identifier CDID1. The control data CDATA1 may optionally comprise the sequence identifier SEQID1. The control data CDATA1 may optionally comprise the group identifier GID1.

The identifiers may be omitted e.g. when the video data VDATA and the control data CDATA1 are stored and/or transmitted together.

SX, SY, SZ denote orthogonal directions.

Figure 2:
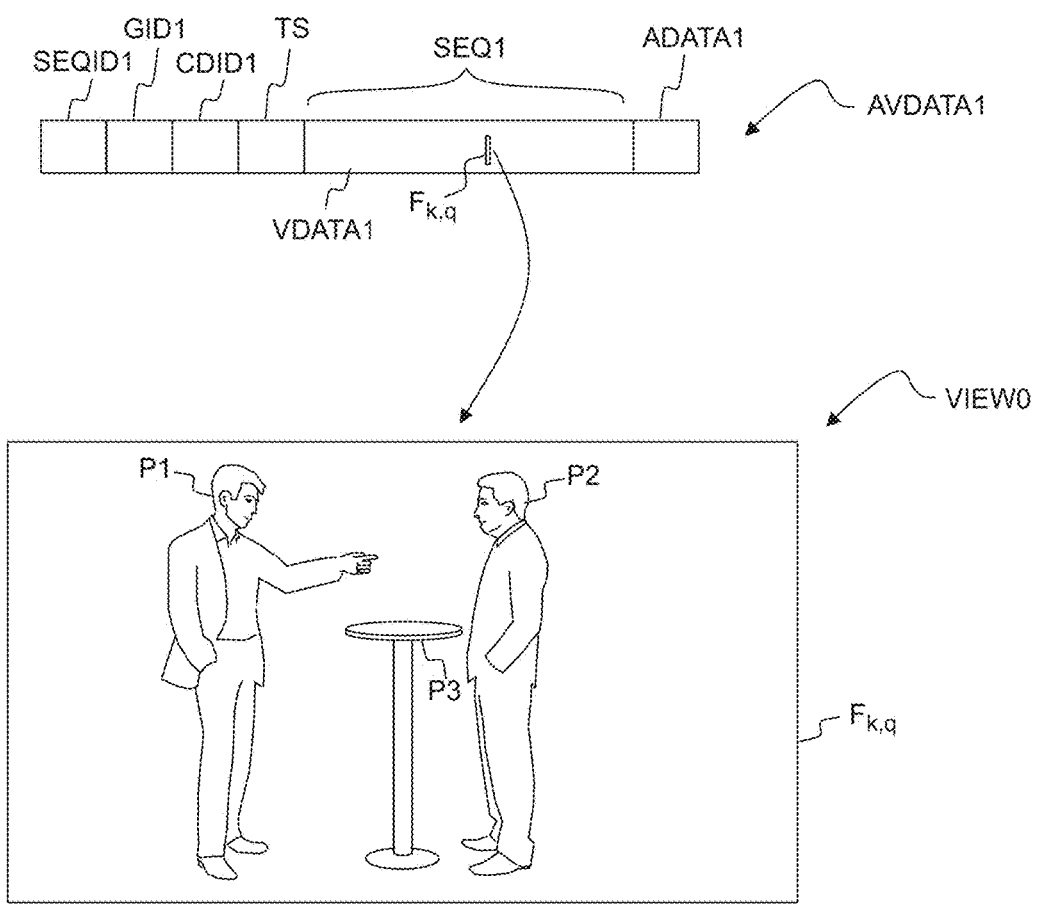
FIG. 2 shows, by way of example, displaying an image frame of a video sequence.

Referring to FIG. 2, an image frame $F_{k,q}$ of the video sequence SEQ1 may be displayed on a display such that the displayed image VIEW0 includes substantially the whole image frame $F_{k,q}$.

The resolution of the whole image frame $F_{k,q}$ may be higher than the resolution of the display, and the resolution of the image frame $F_{k,q}$ may need to be downscaled. The downscaling operation may smooth out some details, and a viewer might not perceive all details of the image frame $F_{k,q}$. For example, the sub-image P1 of the face O1 of a person may appear to be blurred in the displayed image VIEW0.

Figure 3A:
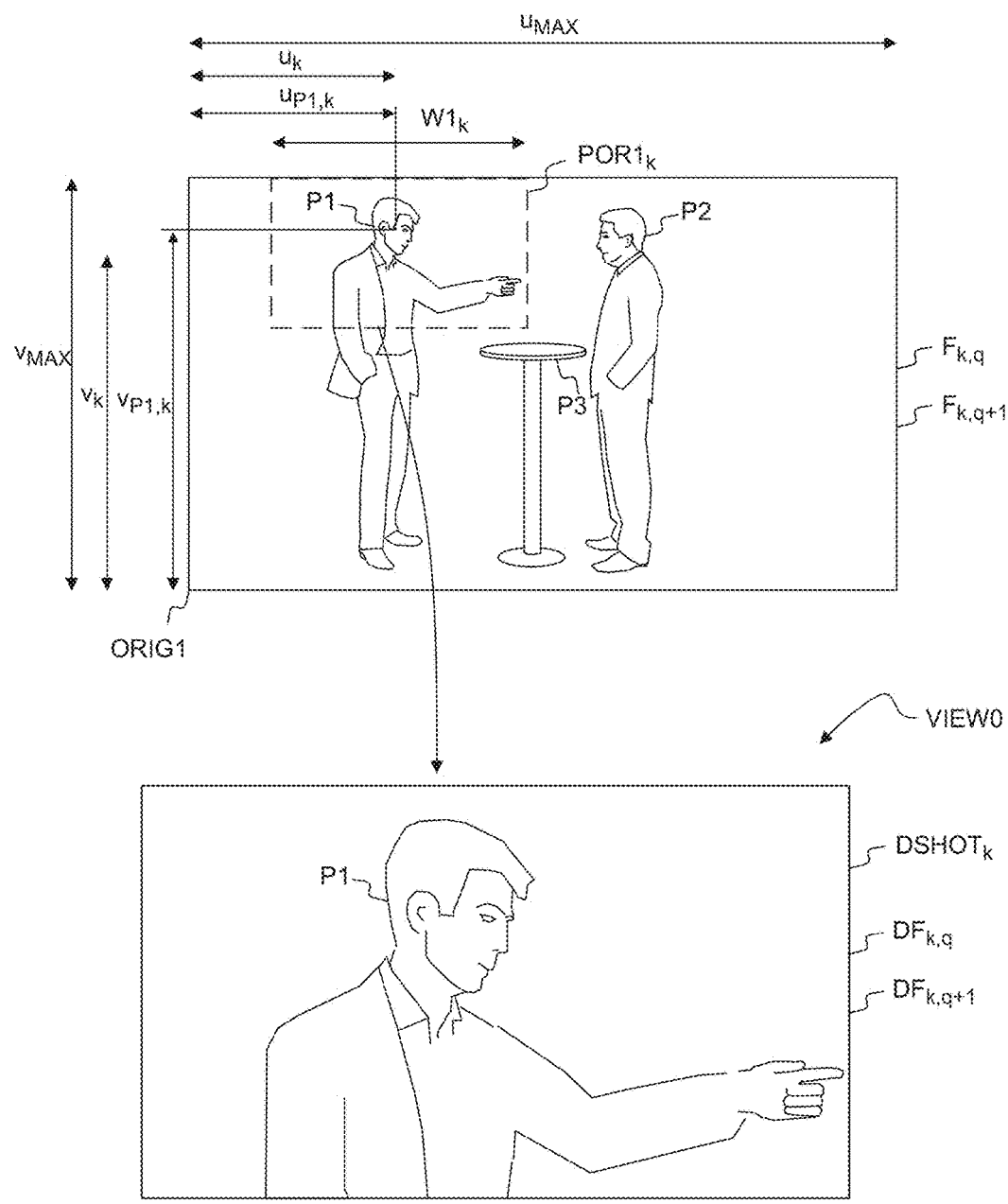
FIG. 3a shows, by way of example, displaying a primary portion of an image frame.

Referring to FIG. 3a, a display device may be configured to operate in a controlled display mode (i.e. in the smart rendering mode), where primary portions of image frames are displayed, and secondary portions of the image frames are not displayed. In particular, the primary portions may be displayed with full resolution of the display, and the secondary portions may be discarded.

One or more objects appearing in the image frames may be determined to be primary objects, and the positions of the primary portions may be determined such that the primary portions comprise the sub-images (e.g. P1) of the primary objects, wherein sub-images (e.g. P2, P3) of secondary objects may be left outside the primary portion POR1. For example, the face O1 of the first person may be temporarily determined to be a primary object PM1. For example, the objects O2, O3 may be temporarily determined to be secondary objects. The primary object PM1 may also be called e.g. as an object of interest (OOI).

Figure 4A:
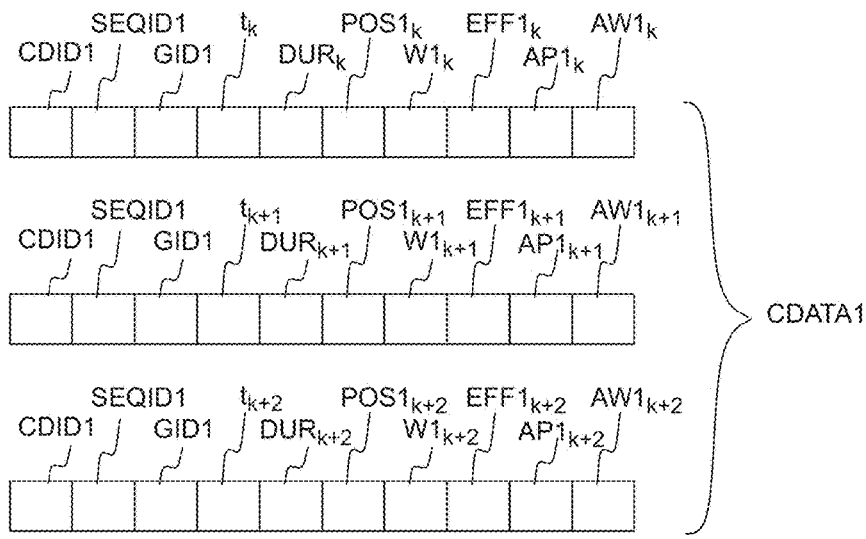
FIG. 4b shows, by way of example, forming video shots of a display sequence from a video sequence according to the control data.
Figure 4B:
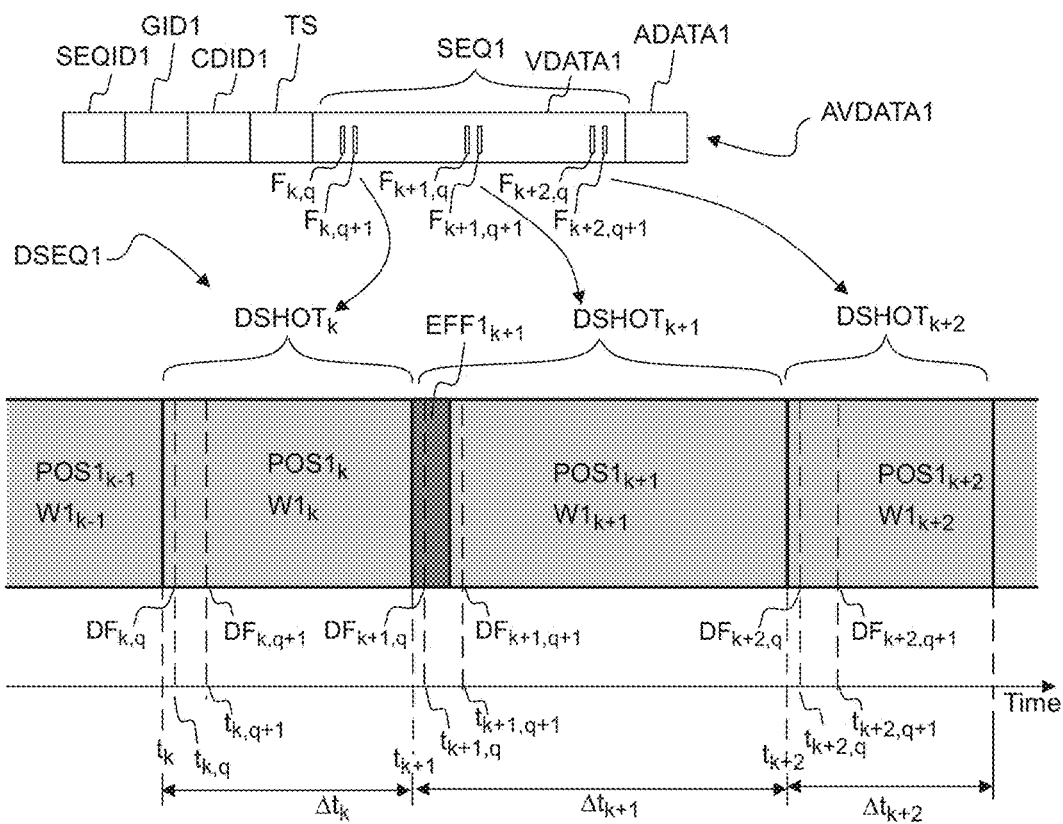
Figure 5A:
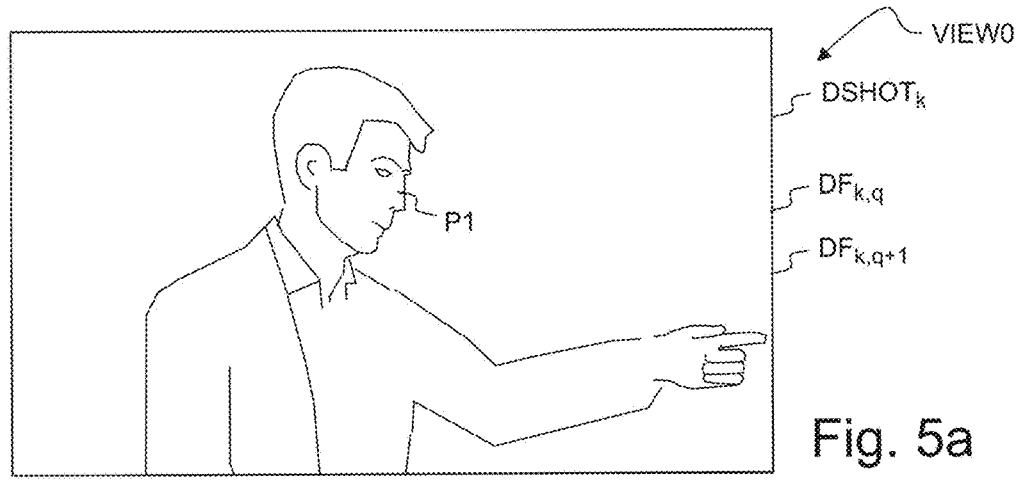
FIGS. 5a, 5b, 5c show, by way of example, images of video shots displayed according to the control data.

For example, the face O1 of the first person may be determined to be a primary object PM1 during a time period $\Delta t_k$ (see e.g. FIGS. 4b and 5a). For example, the face O2 of the second person may be determined to be a primary object PM1 during another time period $\Delta t_{k+2}$ (see e.g. FIG. 5c).

A captured video data VDATA1 may comprise an image frame $F_{k,q}$ and an image frame $F_{k,q+1}$. The image frame $F_{k,q}$ may precede the image frame $F_{k,q+1}$. The video data VDATA1 may be associated with control data CDATA1, which may specify the position $(u_k, v_k)$ of a primary portion POR1 of the image frame $F_{k,q}$ and/or a primary portion POR1 of the image frame $F_{k,q+1}$. The control data CDATA1 may comprise one or more data elements $POS1_k$, which indicate the position $(u_k, v_k)$ of a primary portion POR1 during a time interval $\Delta t_k$. The position may be specified e.g. by providing horizontal and vertical position coordinates $u_k, v_k$. The position coordinates $u_k, v_k$ may indicate e.g. the position of the center of the primary portion POR1 or the position of a corner of the primary portion POR1 with respect to an origin ORIG1. The position coordinates $u_k, v_k$ may indicate e.g. the position of a corner of a primary portion POR1.

The position of the sub-image P1 of the primary object PM1 may be indicated e.g. by coordinates $u_{P1,k}$, $v_{P1,k}$. The sub-image P1 of the primary object PM1 may be detected to have a position $(u_{P1,k}, v_{P1,k})$ in a first image frame $F_{k,q}$. The position $(u_k, v_k)$ of the primary portion POR1 of an image frame $F_{k,q}$, $F_{k,q+1}$ may be selected such that the position $(u_k, v_k)$ substantially matches with the position $(u_{P1,k}, v_{P1,k})$ of the sub-image P1 of the primary object PM1.

The control data CDATA1 may be generated by a method, which comprises:
- providing at least a first video sequence SEQ1, the first video sequence SEQ1 comprising a plurality of image frames $F_{k,q}$, $F_{k,q+1}$, $F_{k,q+2}$, . . .
- determining whether a first image frame $F_{k,q}$ of the first video sequence SEQ1 comprises a sub-image P1 of a primary object PM1,
- selecting a first position $(u_k, v_k)$ of a primary image portion POR1 of an image frame (e.g. $F_{k,q}$ or $F_{k,q+1}$) such that the first position $(u_k, v_k)$ substantially matches with the position $(u_{P1,k}, v_{P1,k})$ of the sub-image P1 of the primary object PM1, if the first image frame $F_{k,q}$ has been determined to comprise said sub-image P1 of said primary object PM1, and
- providing control data CDATA1, which indicates said first position $(u_k, v_k)$.

The control data CDATA1 may be generated by a method, which comprises:
- providing at least a first video sequence SEQ1, the first video sequence SEQ1 comprising a plurality of image frames $F_{k,q}$, $F_{k,q+1}$, $F_{k,q+2}$, . . .
- determining whether a first image frame $F_{k,q}$ of the first video sequence SEQ1 comprises a sub-image P1 of a primary object PM1,
- selecting a first position $(u_k, v_k)$ of a primary image portion POR1 of an image frame (e.g. $F_{k,q}$ or $F_{k,q+1}$) such that the primary image portion POR1 comprises a sub-image P1 of the primary object PM1, if the first image frame $F_{k,q}$ has been determined to comprise said sub-image P1 of said primary object PM1, and
- providing control data CDATA1, which indicates said first position $(u_k, v_k)$.

The control data CDATA1 may be generated by a method, which comprises:

providing at least a first video sequence SEQ1, the first video sequence SEQ1 comprising a plurality of image frames $F_{k,q}$, $F_{k,q+1}$, $F_{k,q+2}$, . . .

determining whether a first image frame $F_{k,q}$ of the first video sequence SEQ1 comprises a sub-image P1 of a primary object PM1, selecting a first position $(u_k,v_k)$ and a size $w1_k$ of a primary image portion POR1 of the first image frame $F_{k,q}$ such that the primary image portion POR1 comprises a sub-image P1 of the primary object PM1, if the first image frame $F_{k,q}$ has been determined to comprise said sub-image P1 of said primary object PM1, and providing control data CDATA1, which indicates said first position $(u_k,v_k)$.

The control data CDATA1 may be generated by a method, which comprises:

providing at least a first video sequence SEQ1, the first video sequence SEQ1 comprising a plurality of image frames $F_{k,q}$, $F_{k,q+1}$, $F_{k,q+2}$, . . .

determining whether a first image frame $F_{k,q}$ of the first video sequence SEQ1 comprises a sub-image P1 of a primary object PM1, selecting a first position $(u_k,v_k)$ and the size $w1_k$ of a primary image portion POR1 of an image frame (e.g. $F_{k,q}$ or $F_{k,q+1}$) such that the primary image portion POR1 comprises a sub-image P1 of the primary object PM1, if the first image frame $F_{k,q}$ has been determined to comprise said sub-image P1 of said primary object PM1, and providing control data CDATA1, which indicates said first position $(u_k,v_k)$.

The origin ORIG1 may be e.g. at the center or at a corner of the image frame $F_{k,q}$, $F_{k,q+1}$. The image frames $F_{k,q}$ and $F_{k,q+1}$ may have a width $u_{MAX}$ and a height $v_{MAX}$. For example, the width $u_{MAX}$ may be e.g. 1920 pixels, and the height $v_{MAX}$ may be e.g. 1080 pixels. The coordinate values may be expressed e.g. in pixels (e.g. $u_k$=600 pixels from the origin ORIG1 in the horizontal direction, $v_k$=850 pixels from the origin in the vertical direction) or as relative coordinates (e.g. $u_k$=30% of the width $u_{MAX}$, $v_k$=80% of the height $v_{MAX}$). The relative coordinates may also be called e.g. as proportional coordinates.

The control data CDATA1 may optionally specify the size of the primary portion POR1. The control data CDATA1 may optionally specify the width $W1_k$ of the primary portion POR1. The control data CDATA1 may comprise one or more data elements $W1_k$, which may indicate the width of the primary portions POR1 during a time interval $\Delta t_k$. The width of a primary portion POR1 may be indicated e.g. by providing the width in pixels (e.g. 600 pixels) or as a relative value (e.g. 40% of the width $u_{MAX}$). The width and the position of a primary portion may also be indicated by providing coordinate values for two different corners of the primary portion.

The width $W1_k$ of the primary portion POR1 may be e.g. smaller than 70% of the width $u_{MAX}$. The width $W1_k$ of the primary portion POR1 may be e.g. in the range of 10% to 70% of the width $u_{MAX}$. The width $W1_k$ may be e.g. in the range of 192 to 1344 pixels when the width $u_{MAX}$ is 1980 pixels.

The size of the primary portion POR1 may be equal to the size of the display. However, the size of the primary portion POR1 may also be smaller than the size of the display, and the resolution of the primary portion POR1 may be upscaled for displaying the presentation image frames on the display. The width $W1_k$ of the of the primary portion POR1 may be greater than the width $u_{MAX}$ of the display, when the width $W1_k$ is expressed by indicating the number of image pixels, and the width $u_{MAX}$ is expressed by indicating the number of display pixels. The size of the primary portion POR1 may be larger than the size of the display, and the resolution of the primary portion POR1 may be downscaled for displaying the presentation image frames on the display. The width $W1_k$ of the of the primary portion POR1 may be smaller than the width $u_{MAX}$ of the display, when the width $W1_k$ is expressed by indicating the number of image pixels, and the width $u_{MAX}$ is expressed by indicating the number of display pixels.

If needed, the aspect ratio of the presentation image frames may be adjusted e.g. by cropping top and/or bottom parts of the primary portion POR1, or by adding empty portions to one or two sides.

The position of the primary portion POR1 of an image frame may be determined such that the position of the center of the primary portion POR1 is substantially different from the position of the center of the image frame.

When the smart rendering mode is enabled, the displayed image VIEW0 may include only the primary portion POR1 of the image frame $F_{k,q}$ or only the primary portion of the image frame $F_{k,q+1}$. The display apparatus may be configured to form a presentation image frame $DF_{k,q}$ from the image frame $F_{k,q}$ according to the control data CDATA1 such that the presentation image frame $DF_{k,q}$ comprises the primary portion POR1, but not the secondary portion POR2 outside said primary portion POR1 (see FIG. 3c). The display apparatus may be configured to display the presentation image frame $DF_{k,q}$ to a viewer. The display apparatus may be configured to form a presentation image frame $DF_{k,q+1}$ from the image frame $F_{k,q+1}$ according to the control data CDATA1 such that the presentation image frame $DF_{k,q+1}$ comprises the primary portion POR1, but not the secondary portion POR2 outside said primary portion POR1.

Figure 3B:
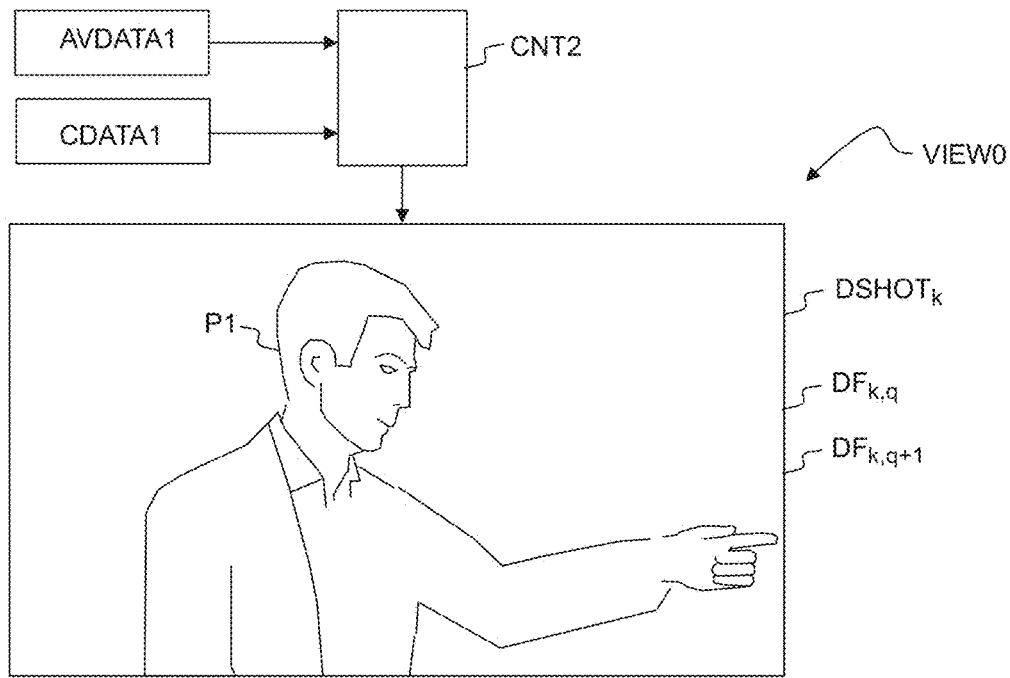
FIG. 3b shows, by way of example, displaying a primary portion of an image frame according to control data.

Referring to FIG. 3b, the display apparatus may be configured to form a presentation video shot $DSHOT_k$ from the video data VDATA1 according to the control data CDATA1. The presentation video shot $DSHOT_k$ may comprise several presentation image frames $DF_{k,q}$, $DF_{k,q+1}$, $DF_{k,q+2}$, . . . . A presentation image frame may comprise the primary portion POR1 of an original image frame such that the presentation image frame comprises a sub-image P1 of the primary object PM1.

A presentation image frame may comprise the primary portion POR1 at the original resolution. A display apparatus may be configured to form the presentation video shot $DSHOT_k$ such that a presentation image frame comprises a sub-image P1 of a primary object PM1 at full original resolution. The presentation image frame may be formed substantially without downscaling. The primary portion POR1 of the original image frame may be used as the presentation image frame such that the number of pixels covering the area of the sub-image P1 of the presentation image frame is equal to or higher than the number of pixels covering the area of the sub-image P1 of the original image frame. Thus, the details of the primary object PM1 may be displayed substantially without smoothing out details.

Thus, a presentation image frame may be formed from the primary portion POR1 by preserving the original resolution or by upscaling the resolution. However, a presentation image frame may also be formed from the primary portion POR1 by downscaling the resolution.

The presentation video shot $DSHOT_k$ may be formed close to the display substantially in real time. The presentation video shot $DSHOT_k$ may be formed frame by frame.

Figure 3C:
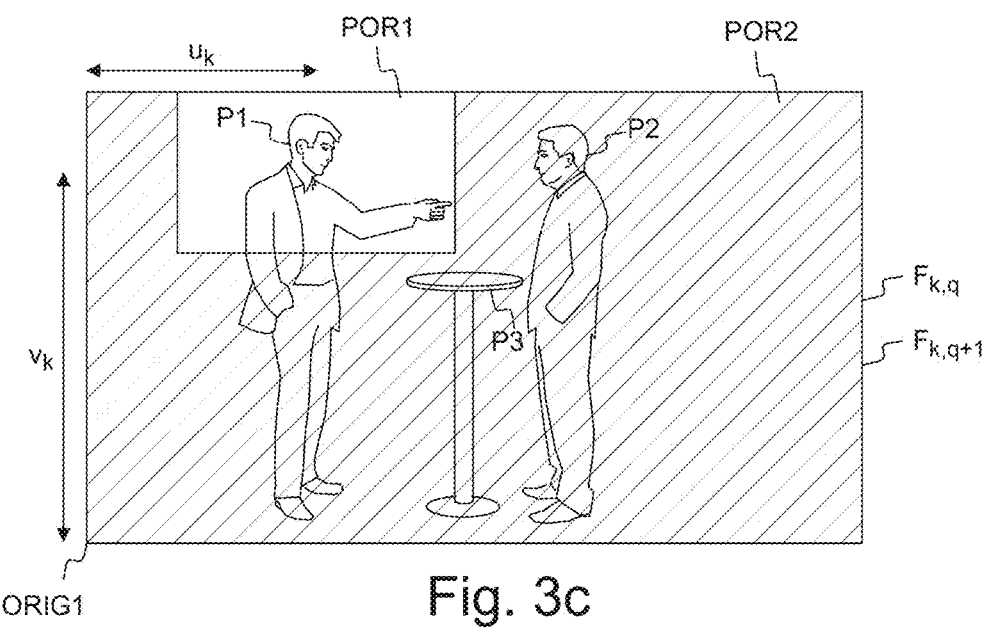
FIG. 3c shows, by way of example, a secondary portion of the image frame of FIG. 3a, FIG. 4a shows, by way of example, control data for providing several video shots from a single video sequence.

Referring to FIG. 3c, an image frame $F_{k,q}$ and/or $F_{k,q+1}$ may have a primary portion POR1 and a secondary portion POR2. The first portion POR1 of the image frame $F_{k,q}$, $F_{k,q+1}$ may be displayed such that the secondary portion POR2 is not displayed during operation in the smart rendering mode. Both portions POR1, POR2 may be simultaneously displayed during operation in the normal mode.

Referring to FIGS. 4a and 4b, the display apparatus may be configured to form a presentation video sequence DSEQ1 from a video sequence SEQ1 according to control data CDATA1, wherein the video sequence DSEQ1 may comprise several video shots $DSHOT_k$, $DSHOT_{k+1}$, $DSHOT_{k+2}$.

The control data CDATA1 may comprise position data $POS1_{k-1}$, $POS1_k$, $POS1_{k+1}$, $POS1_{k+2}$ for specifying several different positions of primary portions POR1, for different time intervals of the video data VDATA1.

For example, the control data CDATA1 may comprise position data $POS1_k$ for specifying the position of a primary portion POR1 for a first presentation video shot $DSHOT_k$, which may be displayed during a time interval $\Delta t_k$. The control data CDATA1 may comprise position data $POS1_{k+1}$ for specifying the position of a primary portion POR1 for a second presentation video shot $DSHOT_{k+1}$, which may be displayed during a different time interval $\Delta t_{k+1}$. The control data CDATA1 may comprise position data $POS1_{k+2}$ for specifying the position of a primary portion POR1 for a third presentation video shot $DSHOT_{k+2}$. The position data $POS1_k$ may indicate e.g. position coordinates $u_k,v_k$, which may define the position of a primary portion POR1 during the time interval $\Delta t_k$. The position data $POS1_{k+1}$ may indicate e.g. position coordinates $u_{k+1},v_{k+1}$, which may define the position of a primary portion POR1 during the time interval $\Delta t_{k+1}$. The position data $POS1_{k+2}$ may indicate e.g. position coordinates $u_{k+2},v_{k+2}$, which may define the position of a primary portion POR1 during the time interval $\Delta t_{k+2}$.

The control data CDATA1 may optionally comprise size control data $W1_{k-1}$, $W1_k$, $W1_{k+1}$, $W1_{k+2}$ which may specify the size of the primary portions POR1 for the different time intervals.

When operation in the smart rendering mode has been enabled, the presentation video sequence DSEQ1 may be displayed on a display. The start of the first presentation video shot $DSHOT_k$ may be defined e.g. by the time data $t_k$. The start of the second presentation video shot $DSHOT_{k+1}$ may be defined e.g. by the time data $t_{k+1}$. The start of the third presentation video shot $DSHOT_{k+2}$ may be defined e.g. by the time data $t_{k+2}$.

Audiovisual data AVDATA1 may comprise video data VDATA1, audio data ADATA1, identifiers CDID1, SEQID1, GID1, and time stamps TS. The length of the video sequence may be e.g. in the range of 1 second to 10 hours. The number of image frames of the video data VDATA1 may be e.g. in the range of $10^1$ to $10^6$.

The video data VDATA1 of a video sequence SEQ1 may comprise a first image frame $F_{k,q}$, a second image frame $F_{k+1,q}$, and a third image frame $F_{k+2,q}$. The control data CDATA1 may indicate a position $u_k,v_k$ of a primary portion POR1 of the first image frame $F_{k,q}$, a position $u_{k+1},v_{k+1}$ of a primary portion POR1 of the second image frame $F_{k+1,q}$, and a position $u_{k+2},v_{k+2}$ of a primary portion POR1 of the third image frame $F_{k+2,q}$. The position $u_{k+2},v_{k+1}$ of the primary portion of the second image frame $F_{k+1,q}$ may be different from the position $u_k,v_k$ of the primary portion of the first image frame $F_{k,q}$. The position coordinates $u_k,v_k$ of the primary portion of the first image frame $F_{k,q}$ may be different from the position coordinates $u_{k+1},v_{k+1}$ of the primary portion of the second image frame $F_{k+1,q}$. The horizontal position coordinate $u_k$ of the primary portion of the first image frame $F_{k,q}$ may be different from the horizontal position coordinate $u_{k+1}$ of the primary portion of the second image frame $F_{k+1,q}$.

The video data VDATA1 of a video sequence SEQ1 may comprise a fourth image frame $F_{k,q+1}$, a fifth image frame $F_{k+1,q+1}$, and a sixth image frame $F_{k+2,q+1}$. The first image frame $F_{k,q}$ may precede the fourth image frame $F_{k,q+1}$. The second image frame $F_{k+1,q}$ may precede the fifth image frame $F_{k+1,q+1}$. The third image frame $F_{k+2,q}$ may precede the sixth image frame $F_{k+2,q+1}$. The control data CDATA1 may indicate a position $u_k,v_k$ of a primary portion POR1 of the fourth image frame $F_{k,q+1}$, a position $u_{k+1},v_{k+1}$ of a primary portion POR1 of the fifth image frame $F_{k+1,q+1}$, and a position $u_{k+2},v_{k+2}$ of a primary portion POR1 of the sixth image frame $F_{k+2,q+2}$. The position $u_{k+1},v_{k+1}$ may be different from the position $u_k,v_k$. The indicated position of the primary portion of the fourth image frame $F_{k,q+1}$ may substantially match with the position $(u_{P1,k}, v_{P1,k})$ of the sub-image of the primary object in the first image frame $F_{k,q}$.

One or more objects O1, O2, O3 may be moving during the event EVE1. The fourth image frame $F_{k,q+1}$ may be substantially similar to the first image frame $F_{k,q}$, or the fourth image frame $F_{k,q+1}$ may be substantially different from the first image frame $F_{k,q}$, depending on the rate of movement of the objects. When the indicated position of the primary portion of the fourth image frame $F_{k,q+1}$ is determined by analyzing the first image frame $F_{k,q}$, it may be highly probable that the primary portion of the fourth image frame $F_{k,q+1}$ also comprises a sub-image of the primary object. When the indicated position of the primary portion of the fourth image frame $F_{k,q+1}$ is determined by analyzing the first image frame $F_{k,q}$, the primary portion of the fourth image frame $F_{k,q+1}$ may comprise a sub-image of the primary object, but the primary portion of the fourth image frame $F_{k,q+1}$ does not need to comprise the sub-image of the primary object.

A fourth presentation image frame $DF_{k,q+1}$ may be formed from the primary portion POR1 of the fourth image frame $F_{k,q+1}$. A fifth presentation image frame $DF_{k+1,q+1}$ may be formed from the primary portion POR1 of the fifth image frame $F_{k+2,q+1}$. A sixth presentation image frame $DF_{k+2,q+1}$ may be formed from the primary portion POR1 of the sixth image frame $F_{k+2,q+1}$.

Control data CDATA1 for indicating the position of the primary portion POR1 of the fourth image frame $F_{k,q+1}$ may be determined e.g. by analyzing the preceding image frame $F_{k,q}$. Control data CDATA1 for indicating the position of the primary portion POR1 of the fifth image frame $F_{k+1,q+1}$ may be determined e.g. by analyzing the preceding image frame $F_{k+1,q}$. Control data CDATA1 for indicating the position of the primary portion POR1 of the sixth image frame $F_{k+2,q+1}$ may be determined e.g. by analyzing the preceding image frame $F_{k+2,q}$.

A first presentation image frame $DF_{k,q}$ may be formed from the primary portion POR1 of the first image frame $F_{k,q}$. A second presentation image frame $DF_{k+1,q}$ may be formed from the primary portion POR1 of the second image frame $F_{k+2,q}$. A third presentation image frame $DF_{k+2,q}$ may be formed from the primary portion POR1 of the third image frame $F_{k+2,q}$.

The duration $\Delta t_k$ of the first presentation video shot $DSHOT_k$ may be optionally defined e.g. by the data $DUR_k$. The duration $\Delta t_{k+1}$ of the second presentation video shot $DSHOT_{k+1}$ may be optionally defined e.g. by the data $DUR_{k+1}$. A duration $\Delta t_{k+2}$ of the third presentation video shot DSHOT$_{k+1}$ may be optionally defined e.g. by the data DUR$_{k+2}$. The duration $\Delta t_k$ of the first presentation video shot DSHOT$_k$ may be e.g. in the range of 1 s to 1 hour. The first presentation video shot DSHOT$_k$ may comprise e.g. $10^1$ to $10^5$ image frames. In an embodiment, the position of the primary portions POR1 of substantially all image frames of the first presentation video shot DSHOT$_k$ may be indicated by the same position coordinates $u_k, v_k$. The second presentation video shot DSHOT$_{k+1}$ may comprise e.g. $10^1$ to $10^5$ image frames.

The display apparatus may be configured to use predetermined operating parameters (default position and/or default size of primary portion) when control data for a certain time period is not available.

A transition from a first position of the primary portion to a second portion may be performed abruptly or smoothly (e.g. by panning). A transition from a first size of the primary portion to a second size may be performed abruptly or smoothly (e.g. by gradual zooming) The type of the transition may be optionally defined by effects data EFF$_k$, EFF$_{k+1}$, EFF$_{k+2}$. For example, the second presentation video shot DSHOT$_{k+1}$ may be configured to begin with a zooming effect defined by the effects data EFF$_{k+1}$.

The control data CDATA1 may optionally comprise audio control data for controlling reproducing sounds during one or more temporal intervals. The audio control data may be utilized to provide focusing on a certain part of a captured audio scene. The control data CDATA1 may comprise e.g. audio control position data AP1$_k$, AP1$_{k+1}$, AP1$_{k+2}$ e.g. for controlling amplifying (enhancing) sounds associated with primary portions of the image frames and/or for controlling suppressing sounds associated with secondary portions of the image frames. Audio zoom may be controlled based on the audio control data. The control data CDATA1 may comprise audio zone size control data AW1$_k$, AW1$_k$, AW1$_{k+1}$, AW1$_{k+2}$. For example, sounds originating outside an spatial zone (i.e audio zone) may be suppressed, wherein the audio control position data may specify the position of the audio zone, and the audio zone size control data may specify the size of the audio zone. In particular, the audio control position data AP1$_k$, AP1$_{k+1}$ may specify different positions of audio zones for different time intervals $\Delta t_k$, $\Delta t_{k+1}$.

The first position POS1$_k$ may be determined by analyzing e.g. a first image frame F$_{k,q}$ of a video sequence SEQ1, and the second position POS1$_{k+1}$ may be determined by analyzing e.g. a second image frame F$_{k+1,q}$ of the same video sequence SEQ1, or the second position POS$_{k+1}$ may be determined by analyzing an image frame F$_{k+1,q}$ of a second video sequence SEQ2. The first image frame F$_{k,q}$ may belong to a first time interval $\Delta t_k$, and the second image frame F$_{k+1,q}$ may belong to a second time interval $\Delta t_{k+1}$. The first image frame F$_{k,q}$ may be associated with a time $t_{k,q}$, and the second image frame F$_{k+1,q}$ may be associated with a time $t_{k+1,q}$.

The control data CDATA1 may indicate the first position POS1$_k$ for several image frames of a video sequence SEQ1, SEQ2. The control data CDATA1 may indicate the second position POS1$_{k+1}$ for several image frames of a video sequence SEQ1, SEQ2. The control data CDATA1 may indicate a first position POS1$_k$ for a first time interval $\Delta t_k$, and the control data CDATA1 may indicate a second position POS1$_{k+1}$ for a second time interval $\Delta t_{k+1}$. The positions of the primary portions of image frames may be determined according to the first position POS1$_k$ during the first time interval $\Delta t_k$ of the presentation video sequence DSEQ1, and the positions of the primary portions of image frames may be determined according to the second position POS1$_{k+1}$ during the second time interval $\Delta t_{k+1}$ of the presentation video sequence DSEQ1. The control data CDATA1 may indicate a first position POS1$_k$ to be used during a first time interval $\Delta t_k$ of the presentation video sequence DSEQ1, and the control data CDATA1 may indicate a second position POS$_{k+1}$ to be used during a second time interval $\Delta t_{k+1}$ of the presentation video sequence DSEQ1.

The first position POS1$_k$ may indicate the position of primary portions of several image frames F$_{k,q}$, F$_{k,q+1}$, F$_{k,q+2}$, . . . . The image frames F$_{k,q}$, F$_{k,q+1}$, F$_{k,q+2}$, . . . may be consecutive image frames. The first position POS1$_k$ determined by analyzing the first image frame F$_{k,q}$ may indicate the position of the primary portion of the first image frame F$_{k,q}$. The first position POS1$_k$ determined by analyzing the first image frame F$_{k,q}$ may indicate the position of the primary portion of several image frames F$_{k,q}$, F$_{k,q+1}$, F$_{k,q+2}$.

The control data CDATA1 may be generated by method, which comprises:

providing at least a first video sequence SEQ1, the first video sequence SEQ1 comprising a first image frame F$_{k,q}$, determining whether the first image frame F$_{k,q}$ comprises a sub-image P1 of a primary object PM1, selecting a first position POS$_k$ of a primary portion POR1 of the first image frame F$_{k,q}$ such that the primary image portion POR1 comprises the sub-image P1 of the primary object PM1, if the first image frame F$_{k,q}$ has been determined to comprise said sub-image P1 of said primary object PM1, and providing control data ($u_k$, $v_k$), CDATA1, which indicates said first position POS$_k$.

The first position POS1$_k$ determined by analyzing the first image frame F$_{k,q}$ may indicate the position of the primary portions of one or more next image frames F$_{k,q+1}$, F$_{k,q+2}$, . . . .

The control data CDATA1 may be generated by method, which comprises:

providing at least a first video sequence SEQ1, the first video sequence SEQ1 comprising a plurality of image frames F$_{k,q}$, F$_{k,q+1}$, F$_{k,q+2}$, . . .

determining whether a first image frame F$_{k,q}$ of the first video sequence SEQ1 comprises a sub-image P1 of a primary object PM1, selecting a first position POS1$_k$ of an primary image portion POR1 of an image frame F$_{k,q+1}$ according to the position of the sub-image P1 of the primary object PM1, if the first image frame F$_{k,q}$ has been determined to comprise said sub-image P1 of said primary object PM1, and providing control data ($u_k,v_k$), CDATA, which indicates said first position POS1$_k$, wherein the first position POS1$_k$ is selected such that the primary image portion POR1 comprises a sub-image P1 of the primary object PM1.

The position POS1$_k$ of a primary portion for a time interval $\Delta t_k$ may also be determined by analyzing an image frame, which does not belong to said time interval $\Delta t_k$. The first image frame F$_{k,q}$ may precede the first time interval $\Delta t_k$, and the second image frame F$_{k+1,q}$ may precede the second time interval $\Delta t_{k+1}$. The first position POS1$_k$ determined by analyzing the first image frame F$_{k,q}$ may indicate the position of one or more preceding image frames F$_{k,q-2}$, F$_{k,q-1}$. The first image frame F$_{k,q}$ may temporally follow time interval $\Delta t_k$, and the second image frame F$_{k+1,q}$ may temporally follow the second time interval $\Delta t_{k+1}$.

The control data CDATA1 may be generated without analyzing all image frames of the video sequence SEQ1. The control data may be determined by analyzing only few image frames. In other words, it is not necessary to analyze all image frames of a video sequence. This may provide considerable savings in processing time. For example, an image frame $F_k$ belonging to the time interval $\Delta t_k$ may be analyzed in order to determine the position of the primary portions for the time interval $\Delta t_k$, and an image frame $F_{k+1,q}$ belonging to the time interval $\Delta t_{k+1}$ may be analyzed in order to determine the position of the primary portions for the time interval $\Delta t_{k+1}$. For example, it may be sufficient to analyze only one image frame at the beginning of each time interval $\Delta t_k$, $\Delta t_{k+1}$. An analyzed image frame (e.g. the frame $F_{k,q}$) may be called e.g. as a trigger frame, as a switching frame or as a base frame. For example, the control data CDATA1 for the whole video sequence SEQ1 may be generated by analyzing e.g. one or two image frames for each time interval $\Delta t_k$, $\Delta t_{k+1}$. Thus, the number of analyzed image frames may be reduced, which in turn may save data processing capacity of the analyzing device for other purposes. The amount of data processing required to generate the control data CDATA1 may be reduced. In an embodiment, a less efficient data processor may be used for analysis of the image frames.

In an embodiment, the control data CDATA1 may be determined by analyzing (base) image frames $F_{k,q}$, $F_{k+1,q}$ which are selected based on analysis of an audio signal. In particular, the image frames may be selected for the analysis based on music tempo (i.e. beat) of an audio signal. Consequently, the presentation video sequence DSEQ1 may comprise several presentation video shots $DSHOT_k$, $DSHOT_{k+1}$, which are temporally synchronized with the audio signal. The analyzed image frames $F_{k,q}$, $F_{k+1,q}$ may be selected based on analysis of the audio signal.

The starting time and the ending time of each presentation video shot $DSHOT_k$, $DSHOT_{k+1}$ may be determined based on analysis of the audio signal. The duration $\Delta t_k$, $\Delta t_{k+1}$ of each presentation video shot $DSHOT_k$, $DSHOT_{k+1}$ may be determined based on analysis of the audio signal. The timing of the transition from the first presentation video shot $DSHOT_k$ to the second presentation video shot $DSHOT_{k+1}$ may be determined based on analysis of the audio signal. The image frames used for the analysis may be selected e.g. based on music tempo. The timing of the presentation video shots may be synchronized with the timing of the sounds.

The timing of the transition from the first presentation video shot $DSHOT_k$ to the second presentation video shot $DSHOT_{k+1}$ may also be determined based on the context data CONTEX1. For example, analysis of a signal from a distance sensor may indicate the distance between an object and a camera, and an image frame associated with a rapid change of the distance may be selected for the analysis.

In general, the timing of the transition from the first presentation video shot $DSHOT_k$ to the second presentation video shot $DSHOT_{k+1}$ may be determined based on analysis of a further video sequence, based on analysis of an audio signal, based on analysis of a sensor signal and/or based on analysis of context data. One or more image frames $F_{k,q}$, $F_{k+1,q}$ of a first video sequence SEQ1 may be selected for analysis based on analysis of second data, wherein said second data may be selected from a group consisting of second video data, audio data, sensor data, and context data. Said second data may be time-stamped in order to enable synchronization. Said second video data does not comprise data of said first video sequence SEQ1. Said sensor data does not comprise data of said first video sequence SEQ1. One or more image frames $F_{k,q}$, $F_{k+1,q}$ of a first video sequence SEQ1 may be selected for analysis based on analysis of second data, wherein said second data may be selected from a group consisting of audio data and context data.

Figure 5B:
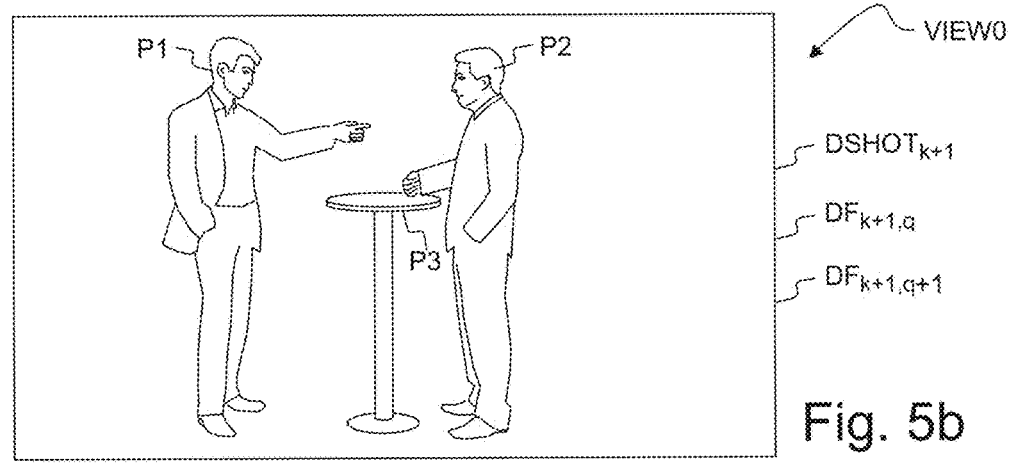
Figure 5C:
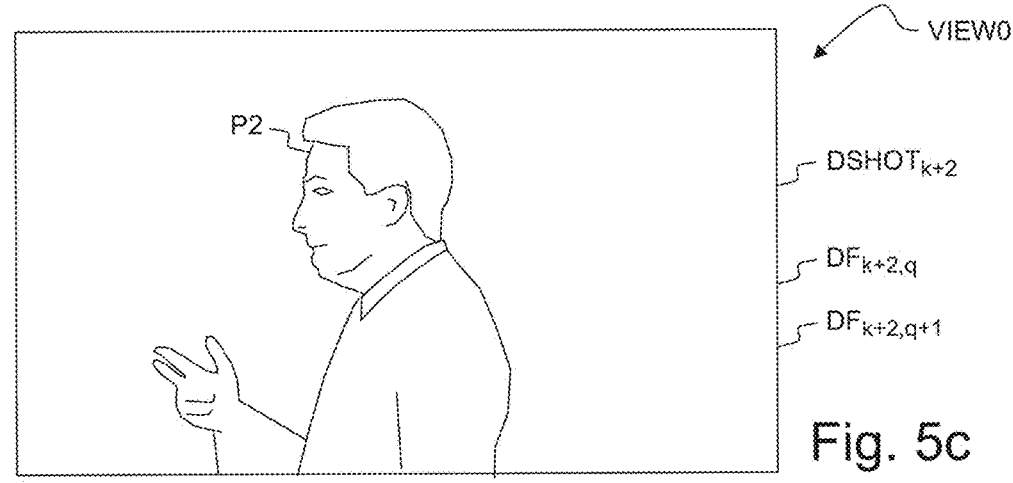

Referring to FIGS. 5a, 5b, 5c, the presentation video sequence DSEQ1 may comprise a first presentation video shot $DSHOT_k$, which comprises a presentation image frame $DF_{k,q+1}$, a second presentation video shot $DSHOT_{k+1}$, which comprises a presentation image frame $DF_{k+1,q+1}$, and a third presentation video shot $DSHOT_{k+1}$, which comprises a presentation image frame $DF_{k+2,q+1}$.

The first presentation video shot $DSHOT_k$ may also comprise a presentation image frame $DF_{k,q}$. The second presentation video shot $DSHOT_{k+1}$ may comprise a presentation image frame $DF_{k+1,q}$. The third presentation video shot $DSHOT_{k+1}$ may comprises a presentation image frame $DF_{k+2,q}$.

Each presentation video shot $DSHOT_k$, $DSHOT_{k+1}$, $DSHOT_{k+2}$ may comprise a plurality of presentation image frames. The number of presentation image frames of each presentation video shot may be e.g. in the range of $10^1$ to $10^5$.

For the first presentation video shot $DSHOT_k$, the object O1 may be determined to be a primary object. The position and/or size of the primary portion POR1 may be determined such that the primary portion POR1 comprises a sub-image P1 of the primary object O1. For the first video shot $DSHOT_k$, the objects O2, O3 may be determined to be secondary objects.

For the presentation second video shot $DSHOT_{k+1}$, e.g. the objects O1, O2, O3 may be determined to be primary objects. The position and/or size of the primary portion POR1 may be determined such that the primary portion POR1 comprises all sub-images P1, P2, P3 of the primary objects O1, O2, O3).

Alternatively, for the second video shot $DSHOT_k$, all objects O1 O2, O3 may be determined to be secondary objects. The control data CDATA1 may indicate that no primary portion exists for the second video shot $DSHOT_{k+1}$.

In an embodiment, control data CDATA1 may indicate the position of the primary portions for a first time period $\Delta t_k$ but not for a second time period $\Delta t_{k+1}$. In that case, a display device may be configured to display (for example) whole image frames during said second time period $\Delta t_{k+1}$ even if the smart operating mode is enabled. The display device may be configured to display whole image frames during a time period if control data CDATA1 for said time period is missing.

For the third presentation video shot $DSHOT_{k+2}$, the object O2 may be determined to be a primary object. The position and/or size of the primary portion POR1 may be determined such that the primary portion POR1 comprises a sub-image P2 of the primary object O2. For the third video shot $DSHOT_{k+2}$, the objects O1, O3 may be determined to be secondary objects.

The resolution of the presentation image frames displayed on a display may be equal to the native resolution of said display. If needed, the resolution of the presentation image frames may be downscaled or upscaled to match with the native resolution of the display.

Figure 5D:
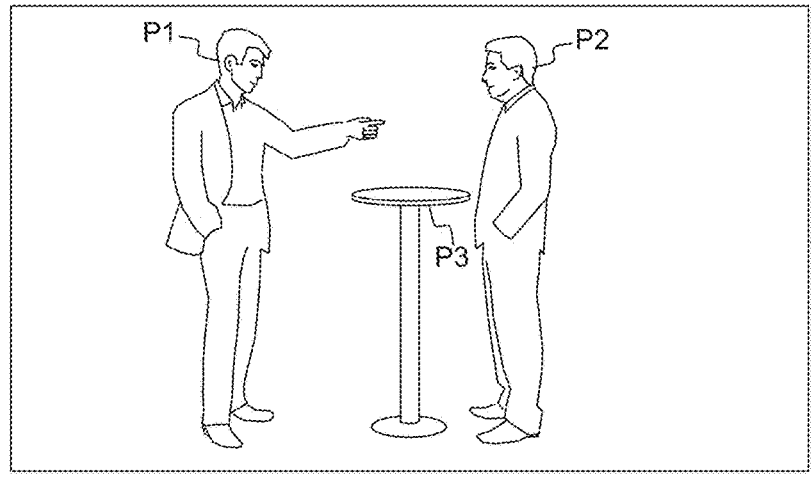
FIGS. 5d, 5e, 5f show, by way of example, image frames of a video sequence.
Figure 5E:
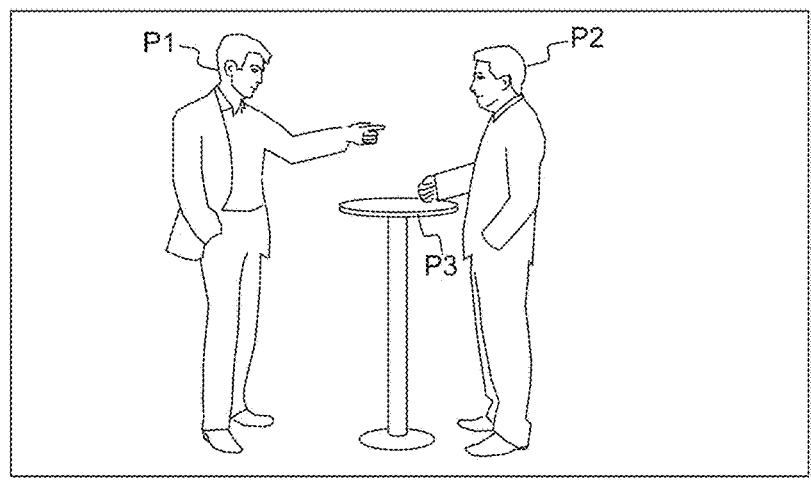
Figure 5F:
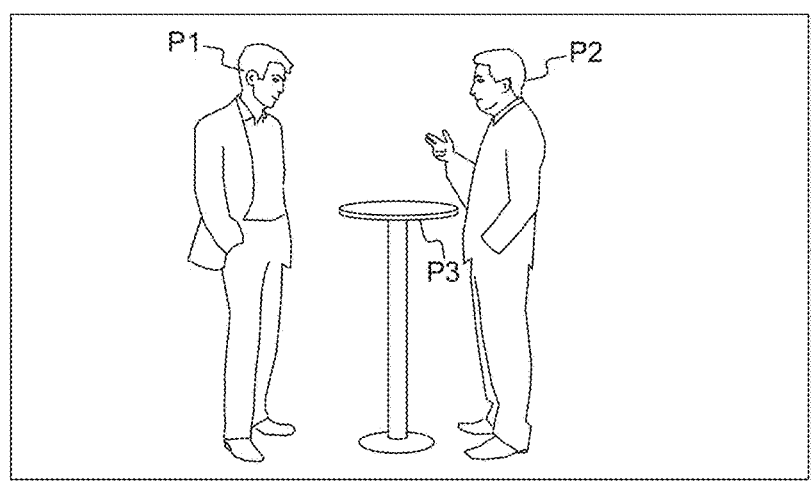

FIGS. 5d, 5e, 5f show image frames $F_{k,q}$, $F_{k,q+1}$, $F_{k+1,q}$, $F_{k+1,q+1}$, $F_{k+2,q}$, $F_{k+2,q+1}$ of the video sequence SEQ1. The image frame $F_{k,q}$ may be associated with the time $t_{k,q}$, the image frame $F_{k,q+1}$ may be associated with the time $t_{k,q+1}$, the image frame $F_{k+1,q}$ may be associated with the time $t_{k+1,q}$, the image frame $F_{k+1,q+1}$ may be associated with the time $t_{k+1,q+1}$, the image frame $F_{k+2,q}$ may be associated with the time $t_{k+2,q}$, and the image frame $F_{k+2,q+1}$ may be associated with the time $t_{k+2,q+1}$. The number of image frames of the video sequence SEQ1 may be e.g. in the range of $10^1$ to $10^6$. The time interval of the video sequence SEQ1 between the times $t_{k,q}$ and $t_{k+1,q}$ may comprise a plurality of further image frames, i.e. the frame $F_{k+1,q}$ does not need to be adjacent to the frame $F_{k,q}$.

The presentation image frame $DF_{k,q}$ of FIG. 5a may be the primary portion POR1 of the image frame $F_{k,q}$ shown in FIG. 5d. The presentation image frame $DF_{k+1,q}$ of FIG. 5b may be the same as the image frame $F_{k+1,q}$ shown in FIG. 5e. The presentation image frame $DF_{k+2,q}$ of FIG. 5c may be the primary portion POR1 of the image frame $F_{k+2,q}$ shown in FIG. 5f.

The presentation image frame $DF_{k,q+1}$ of FIG. 5a may be the primary portion POR1 of the image frame $F_{k,q+1}$ shown in FIG. 5d. The presentation image frame $DF_{k+1,q+1}$ of FIG. 5b may be the same as the image frame $F_{k,q+1}$ shown in FIG. 5e. The presentation image frame $DF_{k+2,q+1}$ of FIG. 5c may be the primary portion POR1 of the image frame $F_{k+2,q+1}$ shown in FIG. 5f.

Figure 6A:
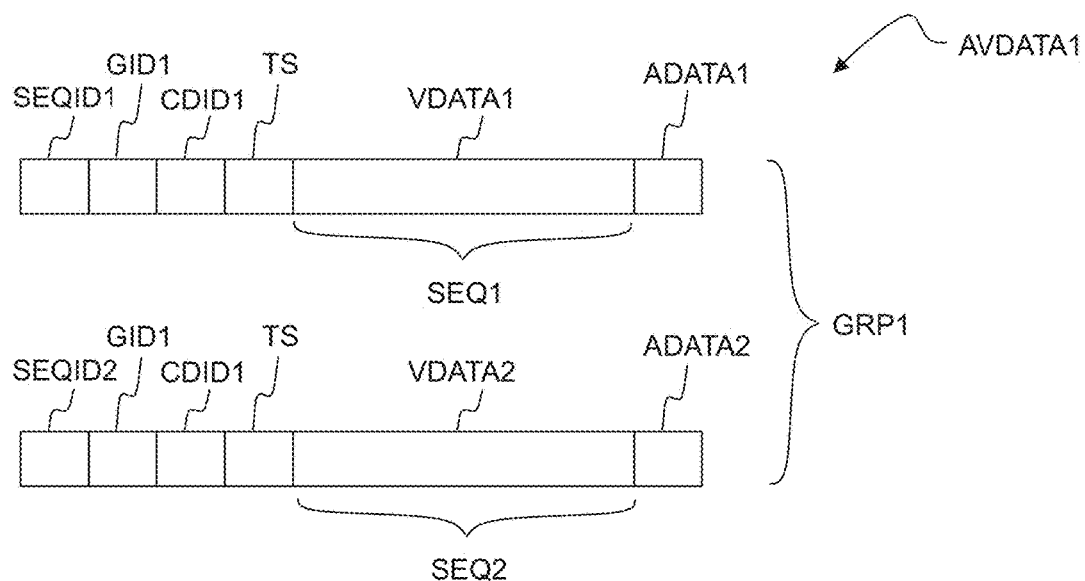
FIG. 6a shows, by way of example, a group of video sequences related to the same event.
Figure 6B:
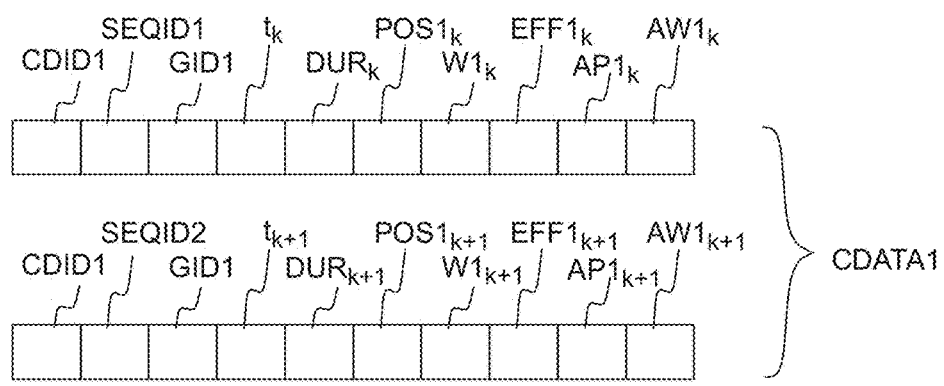
FIG. 6b shows, by way of example, control data for displaying several video shots formed from several video sequences.
Figure 6C:
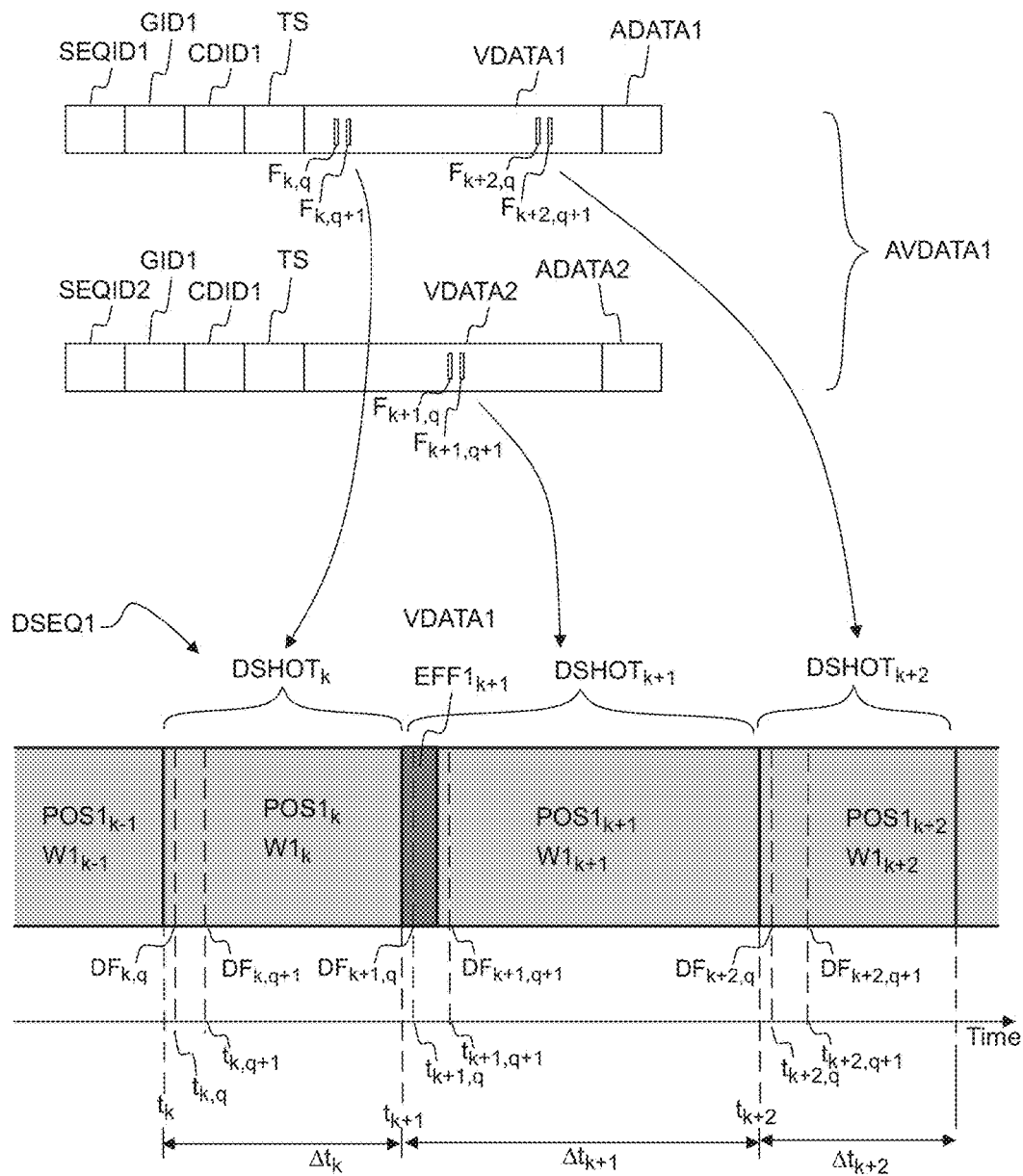
FIG. 6c shows, by way of example, forming video shots from several video sequences according to the control data.

FIGS. 6a to 6c show how a presentation video sequence may be formed from several video sequences according to the control data. In this case, the control data may be called e.g. as the multi-track audio multi track video meta-information rendering template (MT-MRT).

Referring to FIG. 6a, several video sequences SEQ1, SEQ2 may be related to the same event EVE1. The video sequences SEQ1, SEQ2 may belong to a group GRP1. The group GRP1 may be identified by the group identifier GID1. A first video sequence SEQ1 of the group GRP1 may be captured e.g. by using a first portable camera device located at a first view point, and a second video sequence SEQ2 of the group GRP1 may be captured e.g. by using a second portable camera device located at a second view point. The first video sequence SEQ1 and the second video sequence SEQ2 may represent the same event EVE1.

First video data VDATA1 may comprise the image frames of the first video sequence SEQ1, and second video data VDATA1 may comprise the image frames of the second video sequence SEQ2. The first video data VDATA1 may be associated with identifiers SEQID1, GID1, CDIDF1 and/or one or more time stamps TS. The second video data VDATA2 may be associated with identifiers SEQID2, GID1, CDID1 and/or one or more time stamps TS. First audio data ADATA1 may be associated with the first video data VDATA1. Second audio data ADATA2 may be associated with the second video data VDATA1. Audiovisual data AVDATA1 may comprise the first video data VDATA1, the first audio data ADATA1, the second video data VDATA2, and the second audio data ADATA2. In an embodiment, audiovisual data AVDATA1 may comprise the video sequences SEQ1, SEQ2. In an embodiment, a first audiovisual data AVDATA1 may comprise the video sequence SEQ1, and a second audiovisual data AVDATA2 may comprise the second video sequence SEQ2 (see e.g. FIG. 12a).

Referring to FIG. 6b, the group GRP1 may be associated with control data CDATA1. The control data CDATA1 may comprise first control data related to the first video sequence SEQ1, and second control data related to the second video sequence SEQ2. The first control data may be associated with the first video sequence SEQ1 e.g. by an identifier SEQID1. The second control data may be associated with the second video sequence SEQ2 e.g. by an identifier SEQID2. The control data CDATA1 may comprise data elements for controlling displaying primary portions of image frames of two or more video sequences. The control data CDATA1 may comprise data elements for controlling displaying primary portions of image frames of three video sequences. The control data CDATA1 may comprise data elements for controlling displaying primary portions of image frames of four video sequences. The control data CDATA1 may comprise data elements for controlling displaying primary portions of image frames of five video sequences. The control data CDATA1 may comprise data elements for controlling displaying primary portions of image frames of six video sequences.

The control data CDATA1 may be associated with audiovisual data AVDATA1, which comprises a video sequence and an audio track. The control data CDATA1 may be associated with audiovisual data AVDATA1, which comprises several audio tracks associated with the same time interval $\Delta t_k$. The control data CDATA1 may be associated with audiovisual data AVDATA1, which comprises several video sequences associated with the same time interval $\Delta t_k$. The control data CDATA1 may be associated with audiovisual data AVDATA1, which comprises several video sequences and several audio tracks associated with the same time interval $\Delta t_k$.

Referring to FIG. 6c, the control data CDATA1 may comprise data for forming a first presentation video shot $DSHOT_k$ from first video data VDATA1 of a first video sequence SEQ1, and the control data CDATA1 may comprise data for forming a second presentation video shot $DSHOT_{k+1}$ from second video data VDATA2 of a second video sequence SEQ2.

When operating in the smart rendering mode, the primary portions of image frames $F_{k,q}$, $F_{k,q+1}$ the first video sequence SEQ1 may be displayed during a first time interval $\Delta t_k$, and the primary portions of image frames $F_{k+1,q}$, $F_{k+1,q+1}$ of the second video sequence SEQ2 may be displayed during a second time interval $\Delta t_{k+1}$. The primary portions of the image frames $F_{k+2,q}$, $F_{k+2,q+1}$ of the video sequence SEQ1 may be displayed during a third time interval $\Delta t_{k+2}$.

The control data CDATA1 may indicate a first position $POS1_k$ of the primary portions for the first presentation video shot $DSHOT_k$, and a second position $POS1_{k+1}$ of the primary portions for the second presentation video shot $DSHOT_{k+1}$ wherein the first position $POS1_k$ may be different from the second position $POS1_{k+1}$.

Figure 7A:
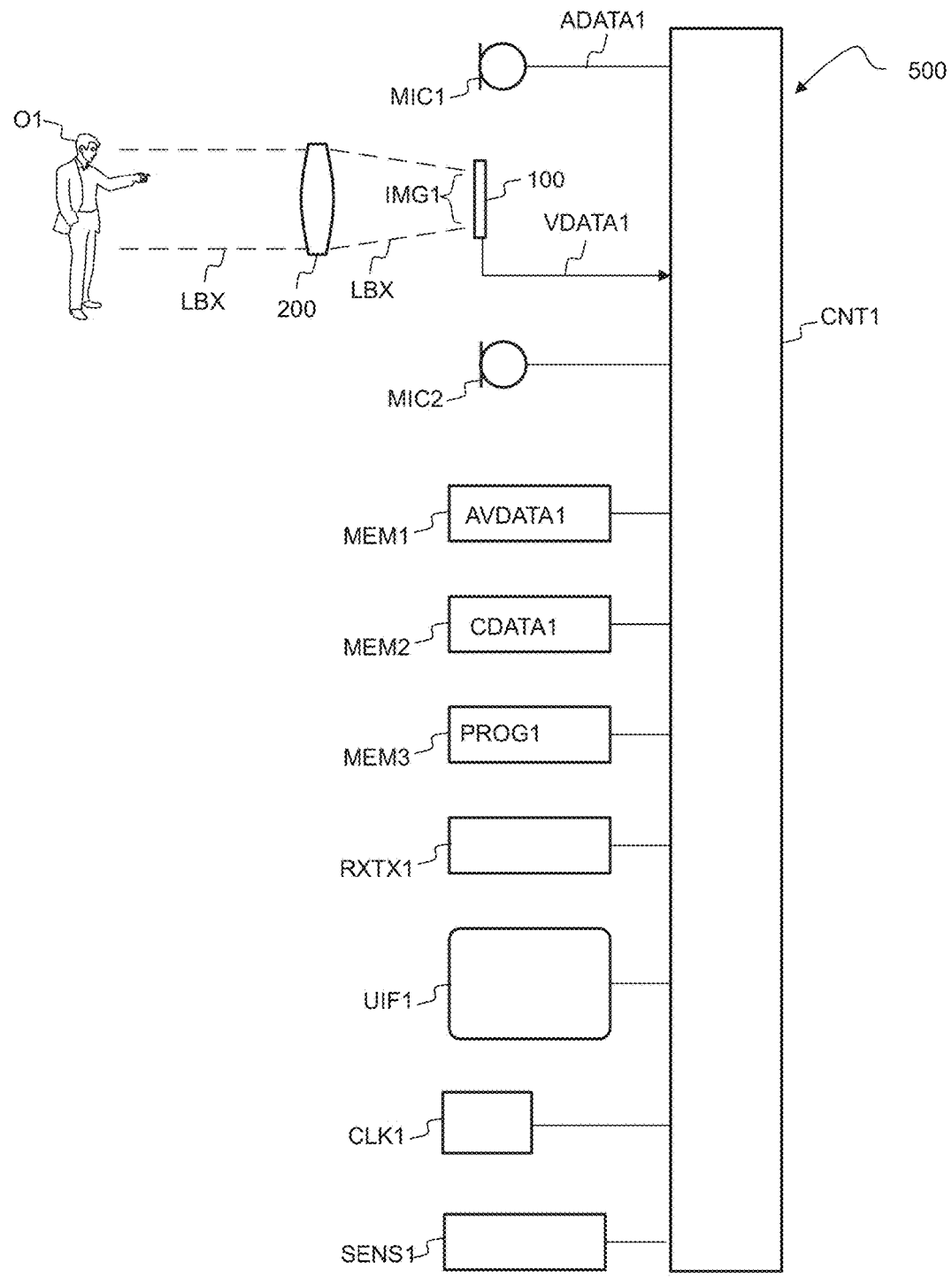
FIG. 7a shows, by way of example, a video analyzing device.

Referring to FIG. 7a, an image analysis device 500 may comprise a control unit CNT1, which is configured to provide control data CDATA1 associated with audiovisual data AVDATA1. The audiovisual data AVDATA1 may comprise video data VDATA1, and optionally also audio data ADATA1.

The device 500 may comprise a memory MEM1 for storing the audiovisual data AVDATA1. The device 500 may comprise a memory MEM2 for storing the control data CDATA1. The device 500 may comprise a memory MEM3 for storing computer program code PROG1. The device 500 may comprise a communication unit RXTX1 for receiving and/or transmitting data. The device 500 may comprise a sensor unit SENS1 for providing context data CONTEX1. The context data CONTEX1 may comprise e.g. information about the geographical location of the device 500. The context data CONTEX1 may comprise e.g. GPS coordinates determined by using a satellite navigation system. The context data CONTEX1 may comprise e.g. information about the orientation of the device 500 with respect to a predetermined compass direction (e.g. with respect to the North). The context data CONTEX1 may comprise e.g. information about the geographical location and/or orientation of the device 500.

The context data may contain information about distance between the camera and an object. The context data may contain information, which indicates which of several faces is closest to the camera. The context data may contain information about the actual size of objects. The context data may contain "audio class information". The "audio class information" may indicate e.g. whether the audio signal during a given time interval represents "music", "speech", "coughing", "laughing", "clapping of hands", etc. In an embodiment, the context data may be determined by analyzing the video sequence (e.g. sharpness of image regions). In an embodiment, the context data may be determined by using additional information, which cannot be derived only from the video sequence itself. The additional information may be provided e.g. by using an accelerometer or based on music tempo. The additional information may e.g. indicate the location of a sound source.

The device 500 may optionally comprise a user interface UIF1 for obtaining commands from a user, for displaying images, and/or for reproducing sounds. In particular, the user interface UIF1 may comprise a touch screen.

The device 500 may optionally comprise an image sensor 100 for capturing video data VDATA1. The device 500 may optionally comprise a clock CLK1 for providing one or more time stamps associated with the video data VDATA1. The device 500 may be configured to receive time information from an external clock by using the communication unit RXTX1. The device 500 may optionally comprise one or more microphones MIC1, MIC2 for providing audio data ADATA1.

Figure 7B:
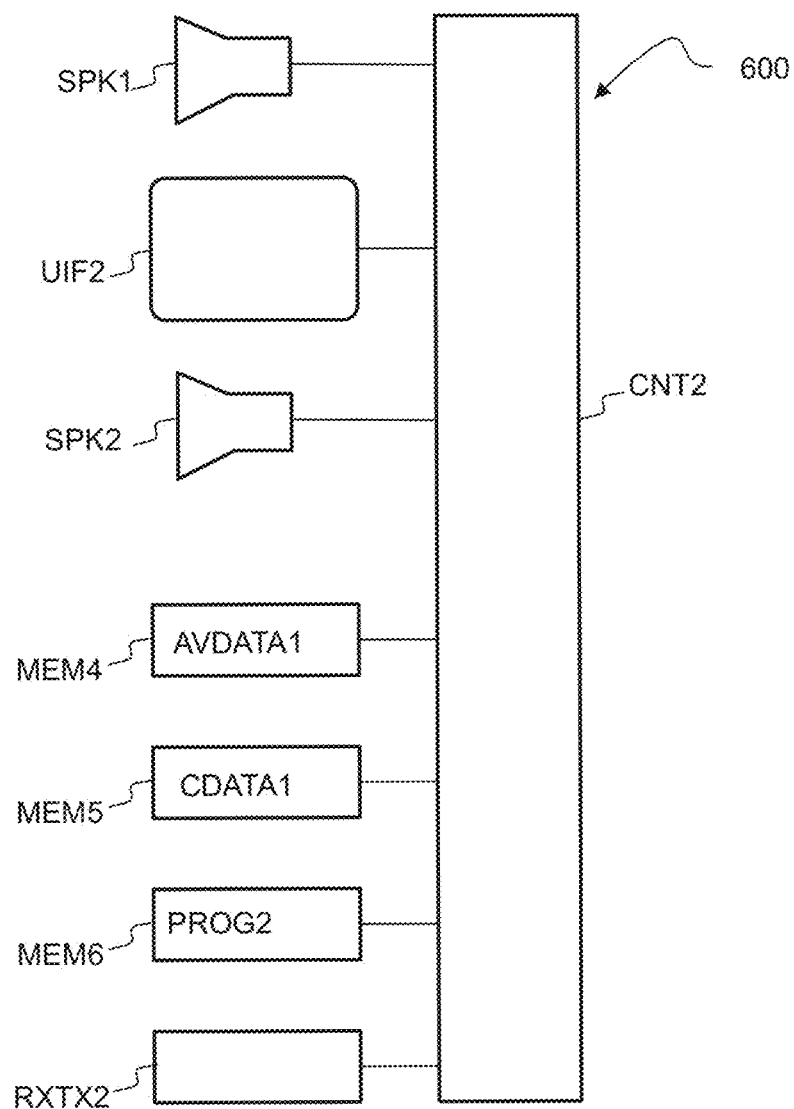
FIG. 7b shows, by way of example, a video displaying device.

Referring to FIG. 7b, a display device 600 may comprise a control unit CNT2, which may be configured to provide a presentation video sequence DSEQ1 from audiovisual data AVDATA1 according to control data CDATA1.

The device 600 may comprise a user interface UIF2. The user interface UIF2 may comprise a display for displaying a presentation video sequence DSEQ1. The user interface UIF2 may comprise a touch screen. The user interface UIF2 may comprise e.g. a touch screen, a keypad or a joystick for receiving commands from a user. Operation in the smart rendering mode may be enabled and/or disabled based on a command received from the user.

When the operation in the smart rendering mode is enabled, primary portions of the image frames may be displayed on the display according to the control data.

When the operation in the smart rendering mode is disabled, substantially the whole area of the image frames may be displayed on the display. In a "normal" operating mode, substantially the whole area of the image frames may be displayed on the display.

In an embodiment, a video sequence SEQ1 may be first displayed on a display in the normal operating mode, and a presentation video sequence DSEQ1 formed from the video sequence SEQ1 may be subsequently displayed on the same display in the smart rendering mode.

The device 600 may comprise a communication unit RXTX2 for receiving and/or transmitting data AVDATA1, CDATA1. The device 600 may optionally comprise a memory for storing audiovisual data AVDATA1. The device 600 may optionally comprise a memory for storing control data CDATA1. The device 600 may comprise a memory MEM6 for storing computer program code PROG2.

The device 600 may optionally comprise one or more speakers SPK1, SPK2 for producing sounds according to audio data ADATA1. The user interface UIF2 may comprise one or more speakers.

In an embodiment, the devices 500 and 600 may be separate portable devices, wherein the data AVDATA1 and CDATA1 may be communicated from the device 500 to the device 600 by using the communication units RXTX1, RXTX2. The communication units RXTX1, RXTX2 may comprise e.g. a radio transmitter/receiver for wireless communication with a mobile telephone network, with a local area network, and/or with the Internet.

However, in an embodiment, the functional units of the devices 500 and 600 may be implemented in the same portable unit, i.e. the device 500 may comprise the device 600.

In an embodiment, an analysis device 500 may comprise a display device 600, said analysis device 500 being configured to generate the control data CDATA1.

In an embodiment, a camera device may comprise a display device 600, wherein a remote server may be configured to generate control data CDATA1.

Figure 8A:
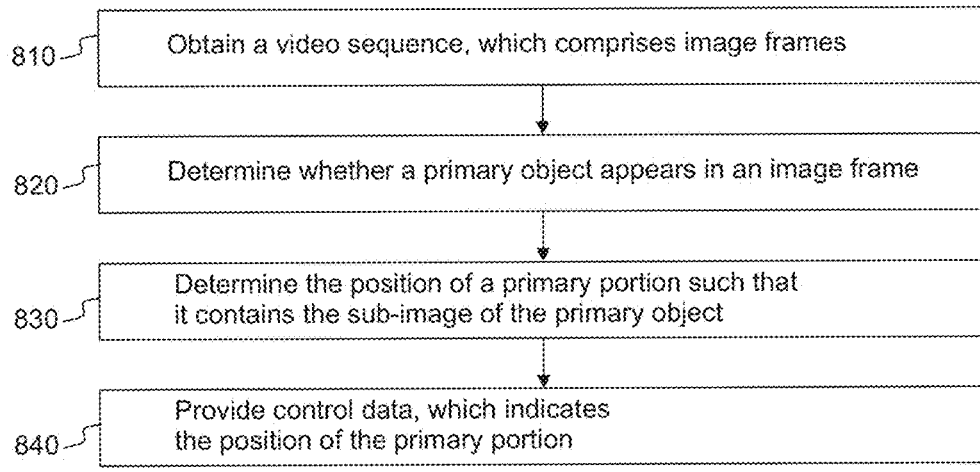
FIG. 8a shows, by way of example, method steps for providing control data.

FIG. 8a shows method steps for providing control data CDATA1 associated with video data VDATA1.

In step 810, a video sequence may be obtained. The video sequence comprises several consecutive image frames.

In step 820, it may be determined whether at least one primary object appears in at least one image frame.

In step 830, when the presence of at least one primary object is detected, the position of a primary portion may be determined such that it contains the sub-images of the detected primary objects.

In step 840, control data CDATA1 may be generated according to the position of the primary portion.

Figure 8B:
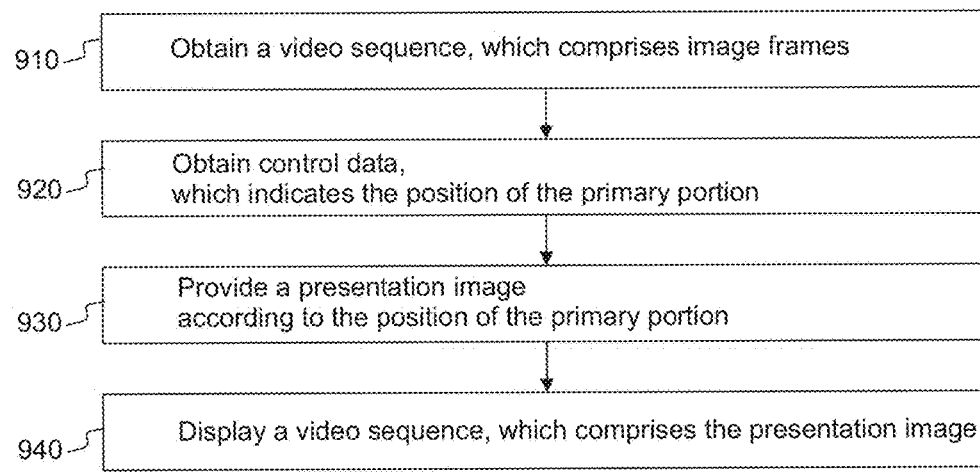
FIG. 8b shows, by way of example, method steps for displaying a video according to control data.

FIG. 8b shows method steps for displaying a video sequence according to the control data CDATA1. The control data CDATA1 may have been determined e.g. according to FIG. 8a.

In step 910, a video sequence may be obtained. The video sequence may comprise several image frames.

In step 920, control data may be obtained. The control data may indicate the position of a primary portion. The control data may indicate the positions of several primary portions.

In step 930, a presentation image frame may be provided from an image frame of the video sequence according to the control data. A presentation video sequence may be formed from the obtained video sequence according to the control data.

If needed, the resolution and/or the aspect ratio adjusted according to the properties of the display.

In step 940, the presentation image frame may be displayed. The presentation video sequence comprising the presentation image frame may be displayed.

Figure 9:
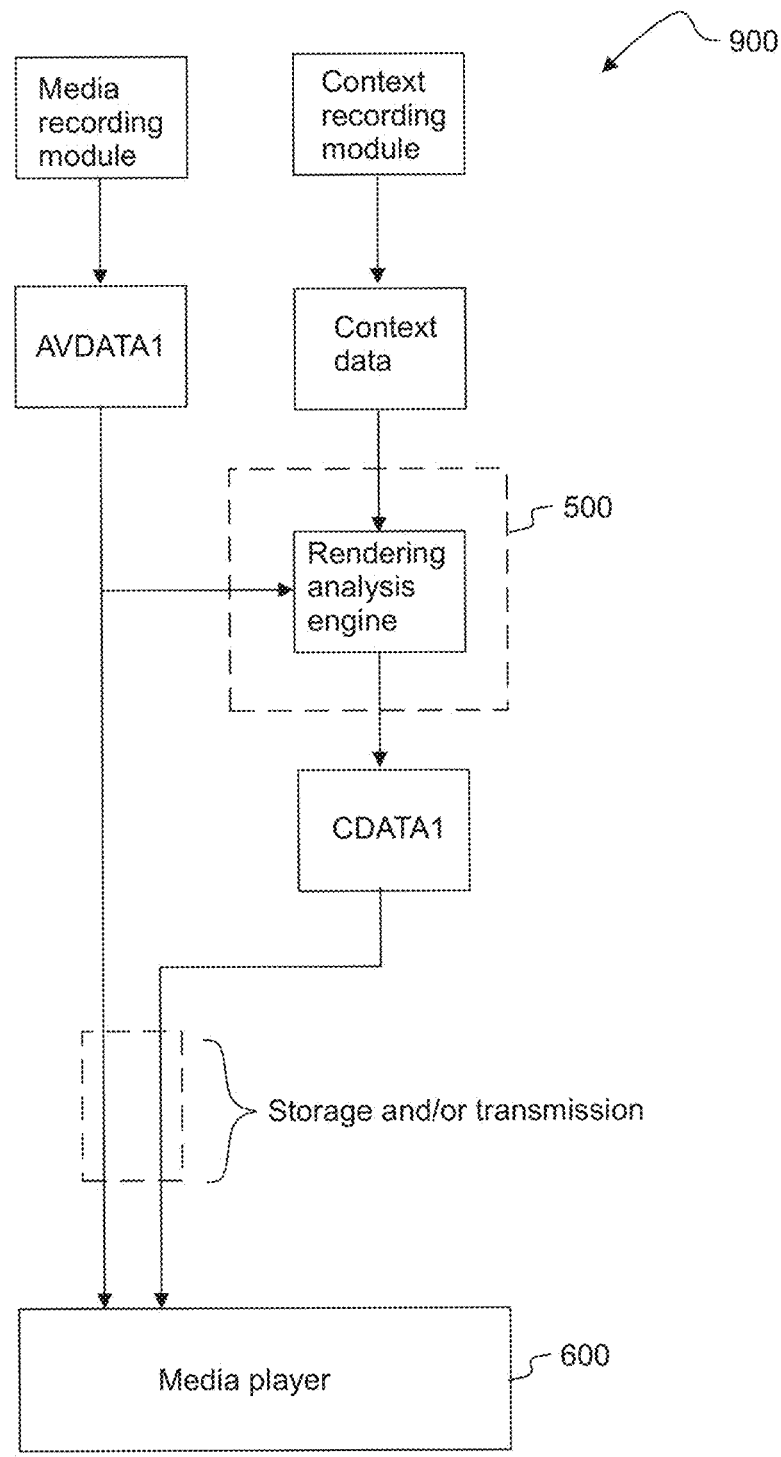
FIG. 9 shows, by way of example, a system, which comprises a device for providing control data, and a device for displaying video according to the control data.

FIG. 9 shows a system 900, which comprises an analysis device 500 for providing control data and/or a display device 600 for displaying video sequences according to the control data.

In an embodiment, the generation of the control data and displaying the images may be performed in the same device.

In an embodiment, the control data and the media file may be obtained from different units (e.g. from a user device and from a server).

In an embodiment, the control data and the media file may be obtained from the same unit (e.g. from the same servers).

In an embodiment, the media file may be sent to a server from a first user device, the server may generate the control data, and the control data may be transmitted to one or more user devices. The control data may be transmitted back to the first user device.

In an embodiment, the control data may be metadata contained in a media file.

In an embodiment, all functionalities of the system 900 may be implemented in the same device. The analysis device 500 may comprise a memory for storing the audiovisual data AVDATA1, and for storing the control data CDATA1. The analysis device 500 may comprise a display 600 for displaying a presentation video sequence DSEQ1 according to the control data CDATA1. The analysis device 500 may comprise a camera for capturing audio signals. The analysis device 500 may comprise one or more microphones for capturing audio signals.

In an embodiment, the analysis device 500, a server for distributing audiovisual data AVDATA1, a server for distributing the control data CDATA1, and a display device 600 may be distributed over a network by using client-server architecture. The display device 600 may be the client, and the analysis and distribution of data may be performed by one or more servers. The audiovisual data AVDATA1 may be captured by using one or more camera devices.

In an embodiment, the analysis device 500, a device for distributing audiovisual data AVDATA1, a device for distributing the control data CDATA1, and a display device 600 may be distributed over a network by using peer-to-peer architecture.

The audiovisual data AVDATA1 may comprise video data VDATA1 and optionally also audio data ADATA1. Video data of the audiovisual data AVDATA1 may be recorded e.g. by using at least one camera. Video data of the audiovisual data AVDATA1 may be recorded e.g. by using at least one image sensor 100 of a camera device. Audio data of the audiovisual data AVDATA1 may be recorded e.g. by using at least one microphone. At least one image sensor may be associated with a sensor SENS1, which may be configured to provide context data CONTEX1. The camera device may have a first geographical location and/or a first orientation during a first time period when the video data is captured. The context data CONTEX1 may comprise data, which indicates said first location and/or said first orientation.

The analysis device 500 may be configured to provide the control data CDATA1. The analysis device 500 may comprise an analysis unit which may be configured to generate control data CDATA1 based on analysis of the video data VDATA1 and the context data CDATA1. The analysis unit may be called e.g. as a rendering analysis engine. The analysis unit may be implemented e.g. by performing computer program code in one or more data processors.

The control data may be stored e.g. as a meta-information associated with audiovisual data AVDATA1. The control data may be stored separately and linked to the audiovisual data AVDATA1 in a suitable manner. The control data may also be embedded in the audiovisual data file, which may be decoded by a display device 600.

The audiovisual data AVDATA1 and the control data CDATA1 may be transmitted to one or more display devices 600. The audiovisual data AVDATA1 and the control data CDATA1 may be optionally stored in a memory before displaying the captured video by a device 600. The audiovisual data AVDATA1 and the control data CDATA1 may be transmitted and/or stored separately.

The audiovisual data AVDATA1 and the control data CDATA1 may also be transmitted and/or stored together.

In an embodiment, a presentation video sequence corresponding to the audiovisual data AVDATA1 and the control data CDATA1 may be displayed by a device 600 such that a distance between the analysis device 500 and the display device is greater than e.g. 1 km. The control data CDATA1 may be obtained from a remote unit such that a distance between the display device 500 and said remote unit may be greater than e.g. 1 km. The remote unit may be e.g. the analysis device 500 or a distribution server connected to the Internet.

In an embodiment, a presentation video sequence SEQ1 corresponding to the audiovisual data AVDATA1 and the control data CDATA1 may be displayed by a device 600 such that the temporal difference (i.e. time delay) between forming the control data CDATA1 and displaying the video sequence may be greater than 1 hour.

Figure 10:
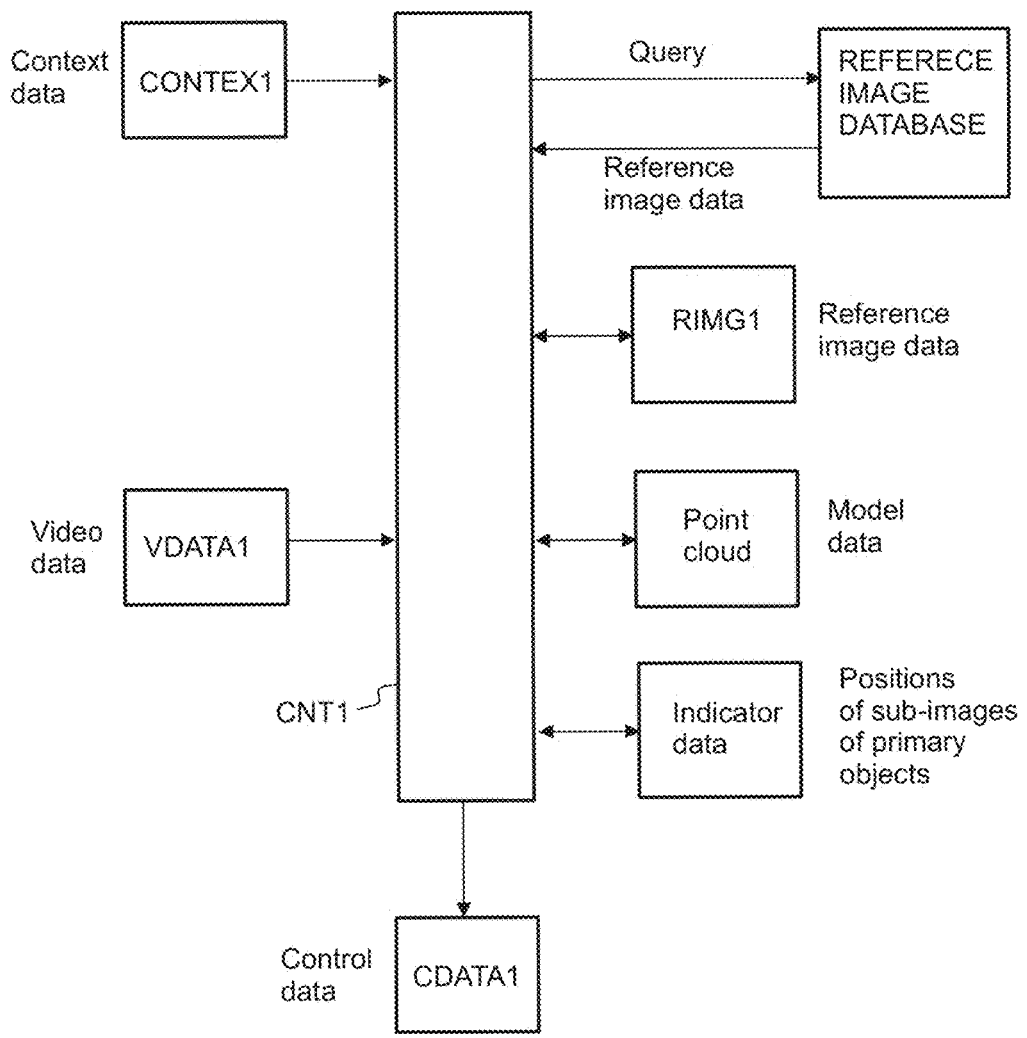
FIG. 10 shows, by way of example, a unit for providing control data.

A modified presentation video sequence may be provided without a need to store the several modified image frames in a memory of the server. The presentation image frames of presentation video sequences may be generated and displayed frame by frame at the display device. The presentation video sequence may be modified without a need to simultaneously store several modified image frames in a memory of the display device. In an embodiment, a display device may be configured to form presentation image frames from image frames of an original video sequence according to the control data such that the presentation image frames are different from the image frames of the original video sequence, wherein the display device may form said presentation image frames such that less than ten presentation image frames are simultaneously stored in a memory of said display device. The display device may form said presentation image frames e.g. such that only one or two presentation image frames are simultaneously stored in a memory of said display device In an embodiment, the original video sequence, first control data for displaying a first presentation video sequence, and second control data for displaying a second presentation video sequence may be simultaneously stored in a memory such that the data size of the first control data may be e.g. smaller than 10 kilobytes, and the data size of the second control data may be e.g. smaller than 10 kilobytes. The data size of the first control data may be e.g. smaller than 0.1% of the data size of the original video sequence, and the data size of the second control data may be e.g. smaller than 0.1% of the data size of the original video sequence Referring to FIG. 10, the control data CDATA1 may be determined by using reference image data RIMG1, which may be retrieved e.g. from a database by using the context data CONTEX1. The reference image data RIMG1 may comprise e.g. images of persons of interest and/or images of objects of interest. The reference image data RIMG1 may be used for determining whether one or more primary objects appear in the captured image frames. The reference image data RIMG1 may be used for determining an order of priority for sub-images appearing in a video sequence.

For example, the audiovisual data AVDATA1 may comprise a video sequence SEQ1, which is stored and/or transmitted as the video data VDATA1. The video sequence SEQ1 may be captured by a camera.

A method for generating the control data CDATA1 may comprise:
- capturing a first video sequence SEQ1,
- providing context data CONTEX1 related to the first video sequence SEQ1, and
- obtaining reference image data RIMG1 based on the context data CONTEX1, and
- comparing the first video sequence SEQ1 with the reference image data RIMG1, in order to determine whether a sub-image appearing in an image frame of the first video sequence SEQ1 may be determined to be a sub-image of a primary object.

A method for generating the control data CDATA1 may comprise:
capturing a first video sequence SEQ1,
providing context data CONTEX1 related to the first video sequence SEQ1, and
obtaining reference image data RIMG1 based on the context data CONTEX1, and
comparing an image frame of the first video sequence with the reference image data RIMG1, in order to determine whether a sub-image appearing in said image frame of the first video sequence SEQ1 may be determined to be a sub-image of a primary object.

The context data CONTEX1 may be determined e.g. by monitoring the orientations of one or more camera devices during capturing one or more video sequences SEQ1, SEQ2 of the event EVE1. The orientation of the camera devices may be monitored e.g. by a compass. The context data CONTEX1 may contain information about the orientations of one or more camera devices. The context data CONTEX1 may be determined e.g. by monitoring the distance between a camera device and an object during capturing a video sequence SEQ1 of the event EVE1. The distance may be monitored e.g. by using an auto-focusing system of a camera device. The context data CONTEX1 may contain information about the distance between the object and the camera device. The context data CONTEX1 may be determined e.g. by monitoring the distances between a camera device and one or more objects during capturing one or more video sequences SEQ1, SEQ2 of the event EVE1. The context data CONTEX1 may contain information about said distances. The context data CONTEX1 may contain audio class data associated with a given time interval (e.g. $\Delta t_k$) of a video sequence SEQ1. The audio class data may be determined by analyzing one or more audio signals associated with the event EVE1. The audio class data may indicate e.g. whether the audio signal represents music, speech, shouting, clapping (i.e. applause), laughing, coughing, chorus and/or silence.

The context data CONTEX1 may comprise e.g. information about the geographical location of the camera. Reference image information RIMG1 may be retrieved from a database by using the location information.

A method for generating the control data CDATA1 may comprise:
detecting the geographical location of the first camera, and
retrieving the reference image data based on the detected geographical location of the first camera.

For example, certain important persons may be likely to appear near a geographical location (e.g. the White House in the Washington D.C. in the USA).

For example, when the context data CONTEX1 indicates that the video sequence SEQ1 is captured near a geographical location, the reference image information RIMG1 retrieved based on the context data CONTEX1 may comprise images of famous persons, which are likely to appear said geographical location. For example, when the context data CONTEX1 indicates that the video sequence SEQ1 is captured near the White House, the reference image information RIMG1 retrieved based on the context data CONTEX1 may comprise images of famous persons, which are likely to appear near the White House. For example, the reference image information RIMG1 may comprise e.g. an image of the president of the USA.

The reference image information RIMG1 may comprise e.g. images of important tourist attractions associated with a geographical location. For example, when the context data CONTEX1 indicates that the video sequence SEQ1 is captured near a certain geographical location, the reference image information RIMG1 retrieved based on the context data CONTEX1 may comprise images of famous tourist attractions associated with said geographical location. For example, the reference image information RIMG1 may comprise images of the Eiffel Tower and the Notre Dame church when the context data indicates that the video sequence is captured in Paris.

One or more sub-images of candidate objects appearing in the image frames of the video sequence may be compared with the reference image information RIMG1 in order to determine whether the candidate objects are primary objects. If the presence of one or more primary objects is detected, the control data may be formed according to the positions of the sub-images of the detected primary objects.

Thanks to retrieving the reference image information RIMG1 according to the context data CONTEX1, the amount of the reference image information RIMG1 may be substantially reduced. This may improve the reliability of determining the presence of the primary objects. This may improve the reliability of correct image recognition.

In an embodiment, a three-dimensional model of the candidate objects may be formed from the video data VDATA1. The three-dimensional model data may be formed e.g. when the camera is moved around the objects and/or when the objects are turned with respect to the camera. The three-dimensional model may be formed e.g. by using several cameras at different viewpoints. The three-dimensional model may be represented e.g. as a point cloud.

In an embodiment, the three-dimensional model may be compared with the reference image information RIMG1 in order to determine whether the candidate objects are primary objects. If the presence of one or more primary objects is detected, the control data may be formed according to the positions of the sub-images of the one or more primary objects detected to be present A control unit CNT1 may be configured to determine the positions of the sub-images of the primary objects by comparing the video data VDATA1 with the reference image information RIMG1. The positions of the sub-images of the primary objects may be indicated by indicator data. The positions of the primary portions may be determined by using the indicator data. The control unit CNT1 may be configured to determine the positions of the primary portions by comparing the video data VDATA1 with the reference image information RIMG1.

Figure 11A:
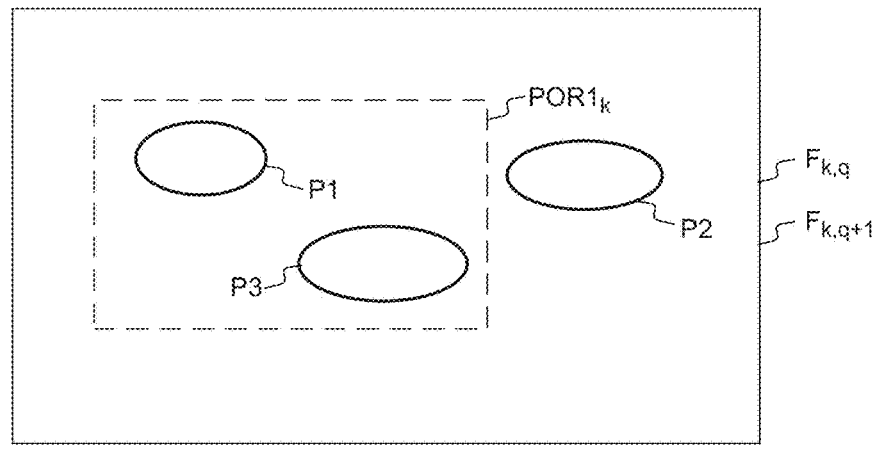
FIG. 11a shows, by way of example, a primary portion, which comprises sub-images of one or more primary objects.

Referring to FIG. 11a, a primary portion $POR1_k$ of an image frame $F_{k,q}$ may comprise sub-images P1, P3 of one or more primary objects O1, O3, wherein the image frame $F_{k,q}$ may comprise a sub-image P2 of at least one object O2, which is not determined to be a primary object. An object whose sub-image appears in the image frame $F_{k,q}$ but which is not determined to be a primary object may be called e.g. as a secondary object. The control data CDATA1 may be determined such that at least a portion of the sub-image P2 of the secondary object is located outside the primary portion $POR1_k$. The control data CDATA1 may be determined such that the sub-image P2 of the secondary object is located outside the primary portion $POR1_k$. Also an image frame $F_{k,q+1}$ may have the primary portion $POR_k$. The primary portion $POR_k$ of the image frame $F_{k,q+1}$ may comprise sub-images P1, P3 of one or more primary objects O1, O3.

In an embodiment, the width $W1_k$ of the primary portion $POR1_k$ may be smaller than or equal to e.g. 70% of the width $u_{MAX}$ of the image frame $F_{k,q}$. In an embodiment, the width $W1_k$ of the primary portion $POR1_k$ may be smaller than or equal to e.g. 50% of the width $u_{MAX}$ of the image frame $F_{k,q}$. In an embodiment, the width $W1_k$ of the primary portion $POR1_k$ may be smaller than or equal to e.g. 30% of the width $u_{MAX}$ of the image frame $F_{k,q}$.

A presentation video shot $DSHOT_k$ may comprise an image frame $F_{k,q}$, which is determined to have a primary portion $POR1_k$. Sounds associated with the presentation video shot $DSHOT_k$ may be emphasized and/or suppressed e.g. according to the position of said primary portion $POR1_k$.

Figure 11B:
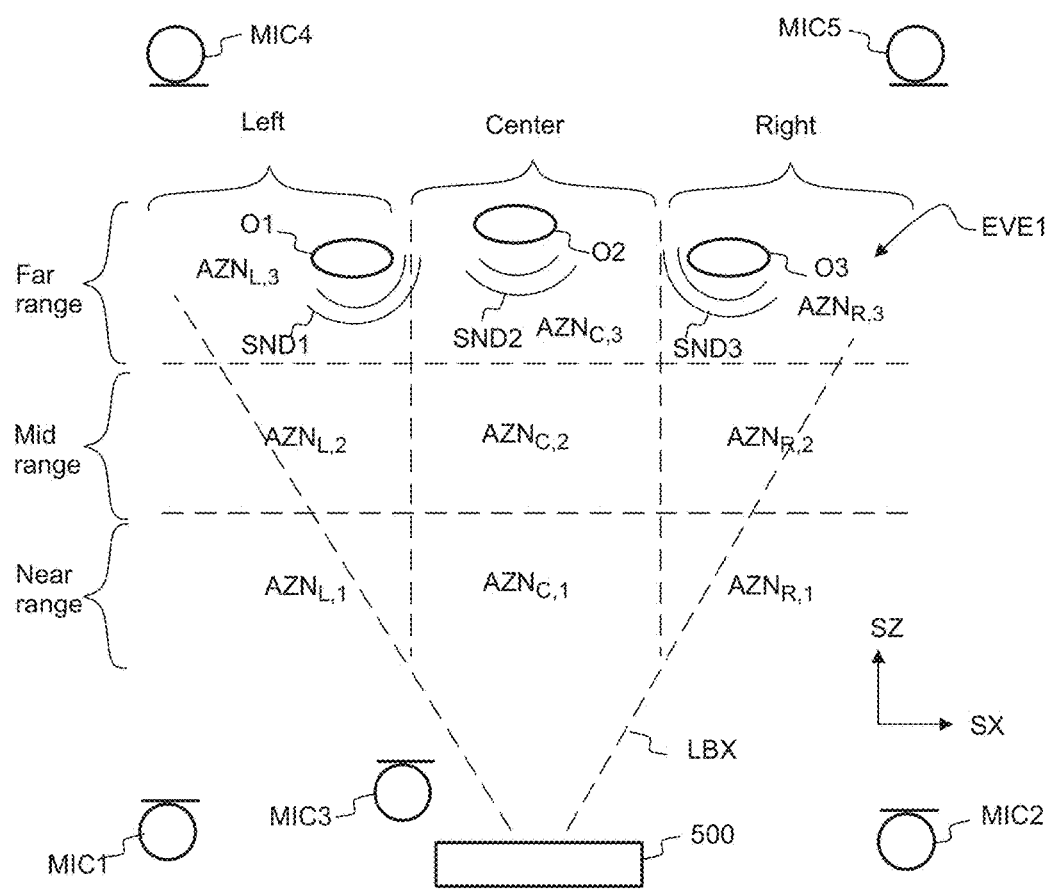
FIG. 11b shows, by way of example, capturing audio signals.

FIG. 11b shows, in a top view, an audio recording scene associated with the event EVE1. The object O1 may emit sounds SND1, the object O2 may emit sounds SND2, and the object O3 may emit sounds SND3. The space may be divided into several audio zones $AZN_{L,3}$, $AZN_{C,3}$, $AZN_{R,3}$, $AZN_{L,2}$, $AZN_{C,2}$, $AZN_{R,2}$, $AZN_{L,1}$, $AZN_{C,1}$, $AZN_{R,1}$, wherein the L may denote left, C may denote center, R may denote right, 1 may denote near region, 2 may denote middle region and 3 may denote far region. The recoded audio data may comprise information, which allows associating one or more recorded sounds with the audio zones. The audio data may comprise location data for one or more different sounds, or the location data may be determined by analyzing the audio data. Location information associated with one or more recorded sounds may be available e.g. with the following granularity: Closeup-Left, Closeup-Center, Closeup-Right, Midrange-Left, Midrange-Center, Midrange-Right, Longshot-Left, Longshot-Center, Longshot-Right.

When a video sequence is displayed according to the control data CDATA1, reproduction of sounds may also be controlled according to audio control data ADATA1 of the control data CDATA1 Audio zoom may be controlled based on the audio control data ADATA1 Sounds emitted from one or more zones AZN may be amplified and/or sounds emitted from one or more zones AZN may be suppressed according to the determined position of the primary portion $POR_k$. For example, when the primary portion $POR1_k$ overlaps the left side and the center areas of the image frames during a time interval $\Delta t_k$, sounds emitted from the zones $AZN_{R,1}$, $AZN_{R,2}$, $AZN_{R,3}$ may be suppressed when compared with sounds emitted from the zones $AZN_{L,1}$, $AZN_{L,2}$, $AZN_{L,3}$, $AZN_{C,1}$, $AZN_{C,2}$, $AZN_{C,3}$, during displaying the presentation video shot $DSHOT_k$.

For example, sounds SND2 emitted from a secondary object O2 may be suppressed when compared with sounds SND1 emitted from the primary object O1.

The analysis device 500 may be configured to generate control data CDATA1, which may comprise audio control data $AP1_k$, $AW1_k$ for controlling suppressing of sounds. The display device 600 (rendering device 600) may comprise an audio signal processor, which may be configured to suppress one or more sounds according to the control signal CDATA1.

Information about the lateral positions of the objects O1, O2, O3 may be determined from the image frames. Information about the distance between the objects and a camera may be obtained e.g. from an auto-focusing unit of the camera or from a distance sensor of the camera.

The audio data ADATA1 may be recorded e.g. by using one or more microphones MIC1, MIC2, MIC3, MIC4, MIC5. One or more microphones may be directional microphones.

In an embodiment, a camera may comprise two or more microphones, and the positions of the microphones is known with respect to the camera.

In an embodiment, the microphones may be separate from the camera, and the positions of the microphones may be determined e.g. by using position sensors.

In an embodiment, one or more microphones MIC1, MIC2, MIC3, MIC4, MIC5 may be parts of the same camera device.

Figure 12A:
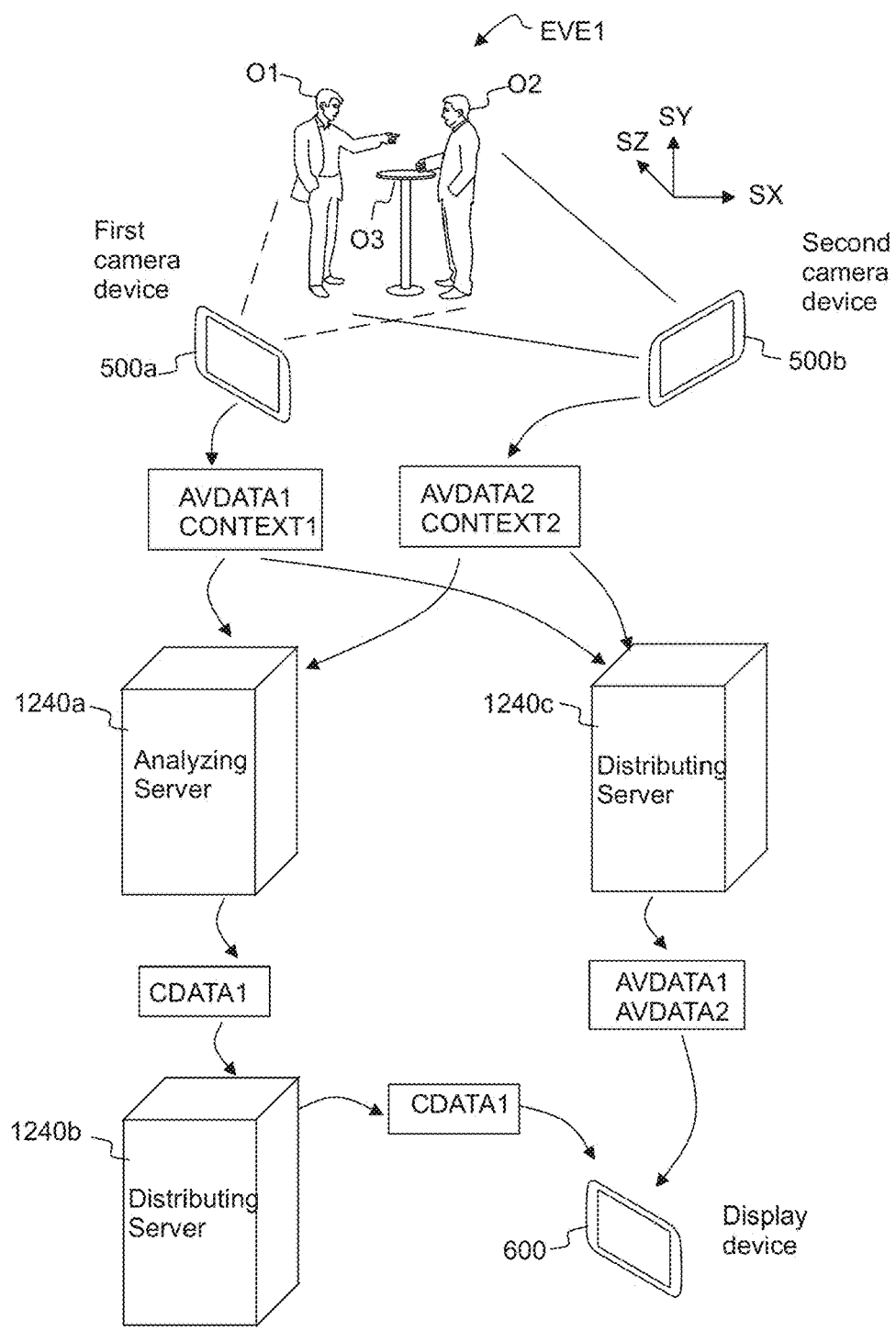
FIG. 12a shows, by way of example, a system for capturing video data, for providing control data, and for distributing the data, and/or for displaying video.

Referring to FIG. 12a, video sequences of an event EVE1 may be captured by using two or more camera units, which are located at different viewpoints. A first camera unit 500a may provide first audiovisual data AVDATA1, which contains a first video sequence SEQ1 of the event EVE1. A second camera unit 500b may provide second audiovisual data AVDATA2, which contains a second video sequence SEQ2 of the event EVE1. The camera unit 500a may comprise a sensor units SENS1 for providing context data CONTEX1. The camera unit 500b may optionally comprise a sensor units SENS1 for providing context data CONTEX2. The audiovisual data AVDATA1, AVDATA2 and the context data CONTEX1, CONTEX2 may be communicated to an analyzing server 1240a. The analyzing server 1240a may be configured to provide control data CDATA1 by analyzing the audiovisual data AVDATA1, AVDATA2 and by using the context data CONTEX1 and/or by using the context data CONTEX2. The control data CDATA1 may be distributed by a distribution server 1240b. The audiovisual data AVDATA1, AVDATA2 may be distributed by a distribution server 1240c. The servers 1240a, 120b, 1240c may be separate, or they may be implemented in the same unit.

The audiovisual data AVDATA1, AVDATA2 and the control data CDATA1 may be communicated to a display device 600. The display device 600 may be configured to form a presentation video sequence DSEQ1 from the audiovisual data AVDATA1, AVDATA2 based on the control data CDATA1. The presentation video sequence DSEQ1 may be displayed when the smart view mode is enabled. A video sequence contained in the audiovisual data AVDATA1 or AVDATA2 may be displayed when the normal view mode is enabled.

The media data files AVDATA1, AVDATA2 with multiple audio/video tracks VDATA1, VDATA2, ADATA1, ADATA2 may be generated using contributions of multiple users, who are attending the same event EVE1 and capturing video sequences and audio tracks of said event EVE1. The captured video sequences and audio tracks may be synchronized e.g. by using the time stamps TS. Switching between the different video sequences may be controlled based on the control data CDATA1 for gaining different perspectives of the event EVE1.

An analyzing device 500, 1240a may provide control data CDATA1. The control data CDATA1 may indicate the positions of the primary portions for different time intervals $\Delta t_k$, $\Delta t_{k+1}$. The control data CDATA1 for multiple audio/video tracks may also comprise switching data (e.g. the identifier SEQID1 SEQID2 in FIG. 6b), which may indicate e.g. an identifier for a video sequence and a switching time indicators (e.g. $t_k$, $t_{k+1}$ in FIG. 6b), which indicate when the switching may take place.

The video sequences may be captured by using camera devices 500a, 500b of several users. The users may share the captured content e.g. by using a content distribution server 1240c or by an application running in one of the camera devices 500a.

First control data associated with the captured video sequences may be generated by using an analyzing server

1240a or by an application running in one of the camera devices 500a. A presentation video sequence may be displayed on a display device 600 according to the first control data. A person may subsequently propose one or more modifications to the presentation video sequence. For example, the timing of one or more presentation video sequences may be modified. For example, said person may propose displaying image frames of a third video sequence instead of displaying image frames of a second video sequence, during the time interval $\Delta t_{k+1}$. An analyzing device 500, 1240a may be configured implement said modifications based on user input obtained from said person. The analyzing device 500, 1240a may be configured to provide a second control data based on the first control data and based on the user input obtained from said person. The control data may be called e.g. as default control data, and the second control data may be called e.g. as "customized" or modified control data.

A user of a display device 600 may subsequently choose whether he desires to view one of the original video sequences of the recorded content, to view a first presentation video sequence according to the first control data, or to view a second presentation video sequence according to the second control data.

In an embodiment, the user may view the first presentation video sequence or the second presentation video sequence such that the recorded video sequences are transferred to the display device only once. The presentation video sequences may be modified by transferring very low amounts of data. It is not necessary to transmit the video sequences again when the presentation video sequence is modified. The data size of the first control data or the second control data may be e.g. smaller than 10 kilobytes. The data size of the first control data or the second control data may be e.g. smaller than 0.1% of the data size of the recorded video sequences.

The video sequences SEQ1, SEQ2 may be stored and/or communicated by using a data compression codec, e.g. by using MPEG-4 Part 2 codec, H.264/MPEG-4 AVC codec, H.265 codec, Windows Media Video (WMV), DivX Pro codec, or a future codec (e.g. High Efficiency Video Coding, HEVC, H.265). The video data VDATA1, VDATA2 may encoded and/or decoded e.g. by using MPEG-4 Part 2 codec, H.264/MPEG-4 AVC codec, H.265 codec, Windows Media Video (WMV), DivX Pro codec, or a future codec (e.g. High Efficiency Video Coding, HEVC, H.265). The video data may also be encoded and/or decoded e.g. by using a lossless codec.

In an embodiment, several video sequences SEQ1, SEQ2 may be captured by using several camera units, which may be located near each other. The context data CONTEX1 may indicate that the video sequences SEQ1, SEQ2 captured by the camera units are related to the same event (e.g. to the event EVE1). For example, the context data CONTEX1 may indicate that the video sequences SEQ1, SEQ2 captured by the camera units are spatially related to the same event (e.g. to the event EVE1). When the video sequences SEQ1, SEQ2 are detected to relate to the same event EVE1, the video sequences SEQ1, SEQ2 may be analyzed in order to determine whether a sub-image (e.g. a sub-image P1) of candidate object appears in the two or more captured video sequences SEQ1, SEQ2. A candidate object appearing in a first video sequence SEQ1 may be determined to be a primary object e.g. when a sub-image of said candidate object appears in two or more video sequences, which relate to the same event. A candidate object may be determined to be a primary object e.g. when a sub-image of said candidate object simultaneously appears in two or more video sequences, which relate to the same event. The video sequences may be determined to relate to the same event e.g. when the video sequences are captured by different camera devices, and the distance between the camera devices is detected to be smaller than a predetermined distance.

The method for generating the control data CDATA1 may comprise:

capturing a first video sequence SEQ1 by a first camera 500a, capturing a second video sequence SEQ2 by a second camera 500b, providing context data CONTEX1 indicative of a distance between the first camera 500a and the second camera 500b, and obtaining reference image data RIMG1 from the second video sequence SEQ2 if the context data CONTEX1 indicates that the distance between the first camera 500a and the second camera 500b is smaller than a predetermined limit, wherein said determining comprises comparing the first video sequence SEQ1 with the reference image data RIMG1.

In an embodiment, three or more video sequences SEQ1, SEQ2 may be captured by using several camera units. The three or more video sequences may be determined to relate to the same event based on context data CONTEX1. For example, the three or more video sequences may be determined to relate to the same event when the context data CONTEX1 indicates that that the camera devices used for capturing said video sequences were near each other during capturing the video sequences. For example the three or more video sequences may be determined to relate to the same event if the context data CONTEX1 indicates that the distances between the camera devices used for capturing said video sequences is smaller than a predetermined limit during capturing the video sequences.

A group of video sequences may comprise e.g. three or more video sequences, which may be determined to relate to the same event based on the context data CONTEX1. If the video sequences of said group are determined to relate to the same event, a candidate object appearing in a first video sequence SEQ1 may be determined to be a primary object e.g. when a sub-image of said candidate object appears in the majority of the other video sequences of said group. A candidate object appearing in a first video sequence SEQ1 at a given time $t_{k,q}$ may be determined to be a primary object e.g. when a sub-image of said candidate object also appears in the majority of the other video sequences of said group at said time $t_{k,q}$. The video control data CDATA1 may be determined such that the primary portion POR1 of at least one image frame $F_{k,q}$ of the first video sequence SEQ1 comprises a sub-image P1 of the primary object.

Figure 12B:
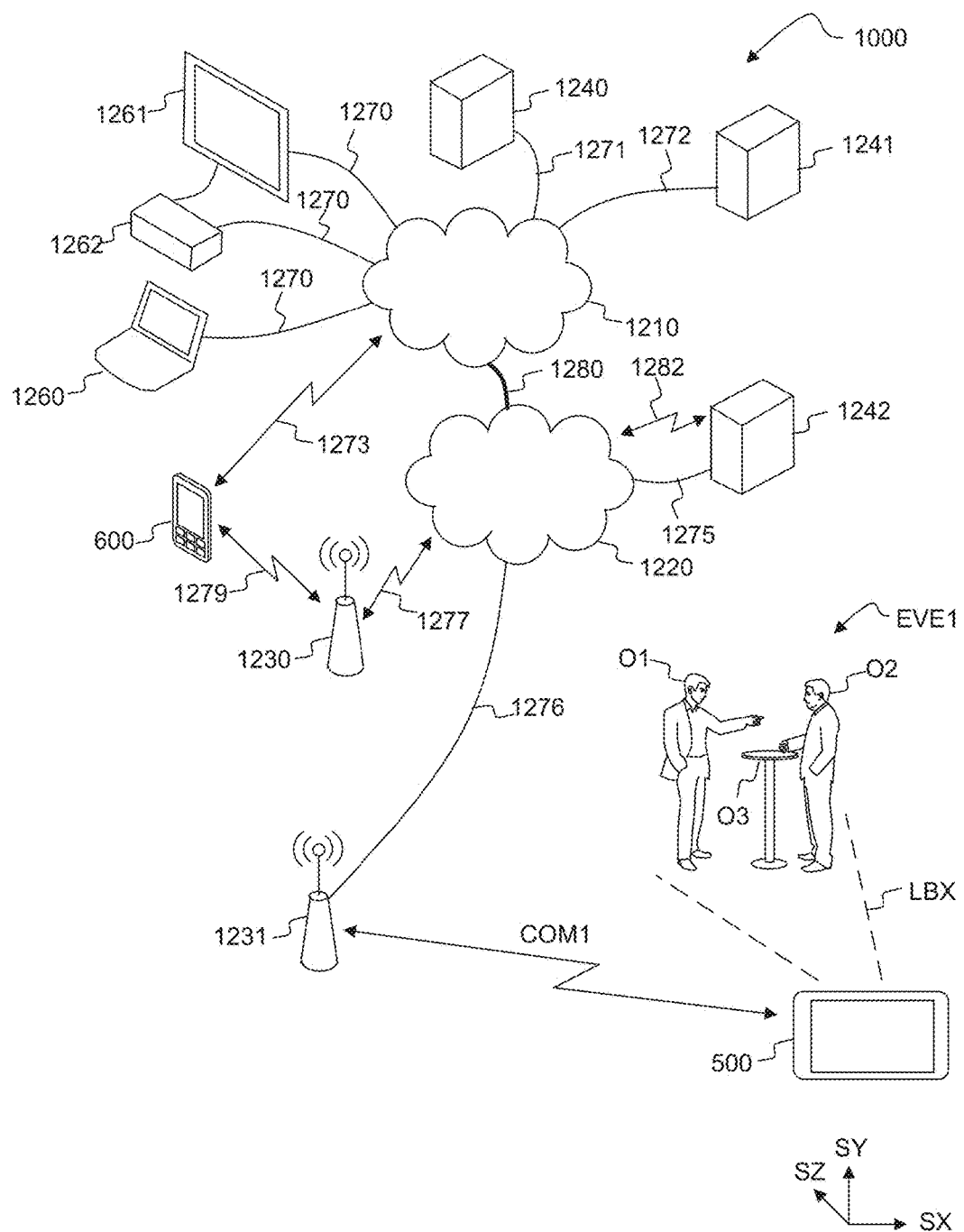
FIG. 12b shows, by way of example, a system for capturing video data, for providing control data, and for distributing the data, and/or for displaying video.

FIG. 12b shows, by way of example, a system 1000 for recording, distributing and displaying video sequences. The system 1000 may comprise a plurality of devices 500, 600, which are arranged to communicate with each other and/or with a server 1240. The devices 500, 600 may be portable. One or more devices 500 may comprise a user interface UIF1 for receiving user input. One or more devices 600 may comprise a user interface UIF2 for enabling smart rendering mode or normal rendering mode. One or more devices 500 and/or a server 1240 may comprise one or more data processors configured to generate control data CDATA1.

The system 1000 may comprise end-user devices such as one or more portable devices 500, 600, mobile phones or smart phones 600, Internet access devices (Internet tablets), personal computers 1260, a display or an image projector 1261 (e.g. a television), and/or a video player 1262. One or more of the devices 500 or portable cameras may comprise an image sensor 100 for capturing image data. A server, a mobile phone, a smart phone, an Internet access device, or a personal computer may be arranged to distribute audiovisual data AVDATA1 and/or control data CDATA1. Distribution and/or storing data may be implemented in the network service framework with one or more servers 1240, 1241, 1242 and one or more user devices. As shown in the example of FIG. 12b, the different devices of the system 1000 may be connected via a fixed network 1210 such as the Internet or a local area network (LAN). The devices may be connected via a mobile communication network 1220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks may be connected to each other by means of a communication interface 1280. A network (1210 and/or 1220) may comprise network elements such as routers and switches to handle data (not shown). A network may comprise communication interfaces such as one or more base stations 1230 and 1231 to provide access for the different devices to the network. The base stations 1230, 1231 may themselves be connected to the mobile communications network 1220 via a fixed connection 1276 and/or via a wireless connection 1277. There may be a number of servers connected to the network. For example, a server 1240 for providing a network service such as a social media service may be connected to the network 1210. The server 1240 may generate and/or distribute control data CDATA1. A second server 1241 for providing a network service may be connected to the network 1210. A server 1242 for providing a network service may be connected to the mobile communications network 1220. Some of the above devices, for example the servers 1240, 1241, 1242 may be arranged such that they make up the Internet with the communication elements residing in the network 1210. The devices 500, 600, 1260, 1261, 1262 can also be made of multiple parts. One or more devices may be connected to the networks 1210, 1220 via a wireless connection 1273. Communication COM1 between a device 500 and a second device of the system 1000 may be fixed and/or wireless. One or more devices may be connected to the networks 1210, 1220 via communication connections such as a fixed connection 1270, 1271, 1272 and 1280. One or more devices may be connected to the Internet via a wireless connection 1273. One or more devices may be connected to the mobile network 1220 via a fixed connection 1275. A device 500, 600 may be connected to the mobile network 1220 via a wireless connection COM1, 1279 and/or 1282. The connections 1271 to 1282 may be implemented by means of communication interfaces at the respective ends of the communication connection. A user device 500, 600 or 1260 may also act as web service server, just like the various network devices 1240, 1241 and 1242. The functions of this web service server may be distributed across multiple devices. Application elements and libraries may be implemented as software components residing on one device. Alternatively, the software components may be distributed across several devices. The software components may be distributed across several devices so as to form a cloud.

Figures 12C, 13:
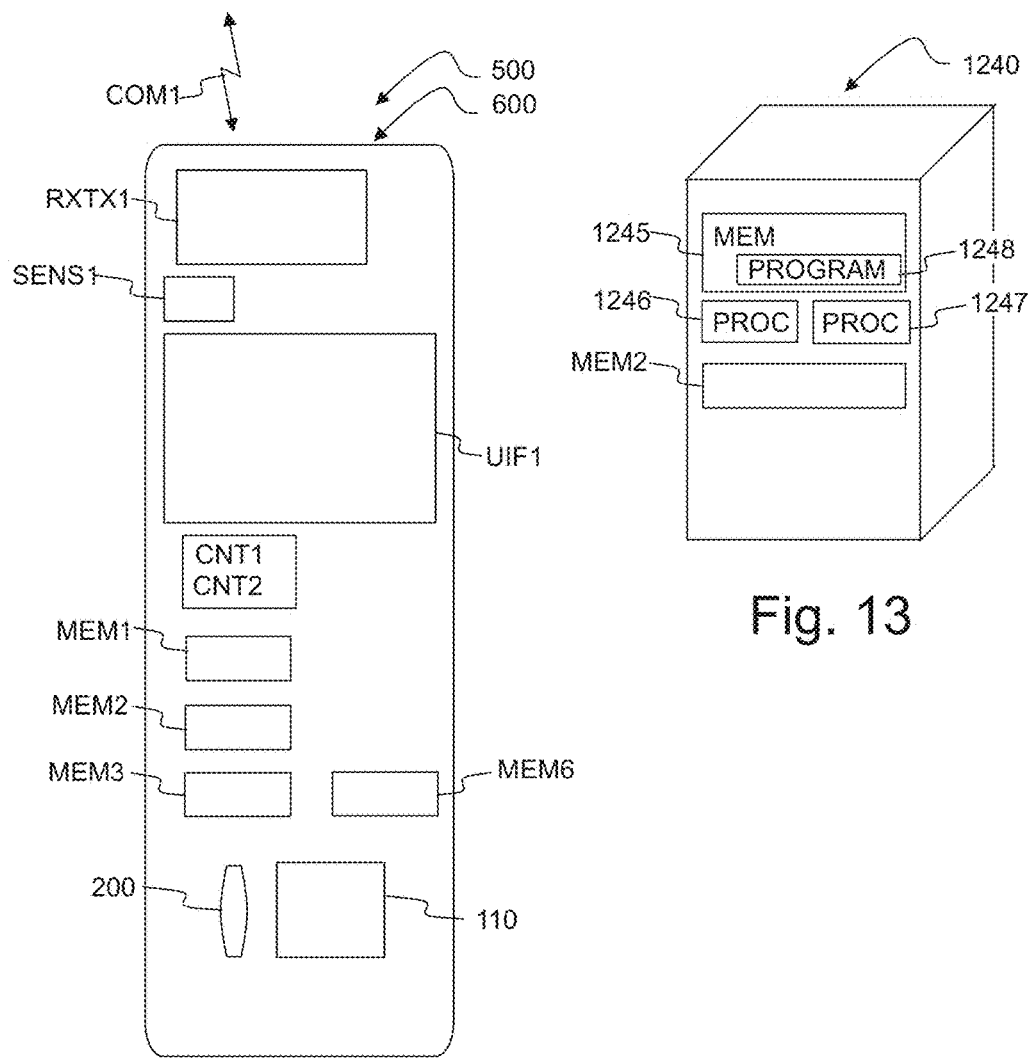
FIG. 12c shows, by way of example, a video analyzing and/or playback device.
FIG. 13 shows, by way of example, a server for providing control data.

FIG. 12c shows a portable device 500, 600 which may be used as a part of the communication system 1000. The device may be e.g. a mobile phone, a smartphone, a communicator, a portable computer, a camera, or a personal digital assistant (PDA).

The device 500 may comprise a control unit CNT1 for providing control data CDATA1. The device may comprise a sensor SENS1 for providing context data CONTEX1. The device may comprise a communication unit RXTX1 for receiving and/or transmitting data. The device may comprise a user interface UIF1 for receiving commands from a user. The device may comprise a memory MEM1 for storing audiovisual data AVDATA1, a memory MEM2 for storing control data CDATA1, a memory MEM3 for storing computer program PROG1 for causing the device to provide the control data CDATA1. The device may comprise an image sensor 100 and imaging optics 200 for capturing video sequences.

The device 600 may comprise a control unit CNT2 for displaying video sequences according to the control data. The device may comprise a user interface UIF1, which comprises a display for displaying video sequences. The device may comprise a user interface UIF1 for receiving user input for setting the display operating mode (e.g. smart mode or normal). The device may comprise a memory MEM1 for storing audiovisual data AVDATA1, a memory MEM2 for storing control data CDATA1, a memory MEM6 for storing computer program PROG2 for causing the device to display video sequences according to the control data. The device may comprise one or more microphones for recording audio signals. The device may comprise one or more speakers for reproducing audio signals.

The resolution of a video sequence may be e.g. 640×480, 1280×720, 1920×1080, 3840×2160, or 7680×4320 pixels. The resolution of a display may be e.g. 400×240, 800×480, 1280×768, or 1920×1080 pixels. The video sequence may be displayed by a display, whose resolution is e.g. in the range of 5% to 50% of the resolution of said video sequence.

In an embodiment, the functionalities of the analysis device 500 and the display device 600 may be implemented in the same device.

In an embodiment, the display device 600 may be physically separate from the analysis device 500.

FIG. 13 shows a server 1240, which may comprise a memory 1245, one or more processors 1246, 1247, and computer program code 1248 residing in the memory 1245 for implementing, for example, a service for determining control data CDATA1.

Figure 14A:
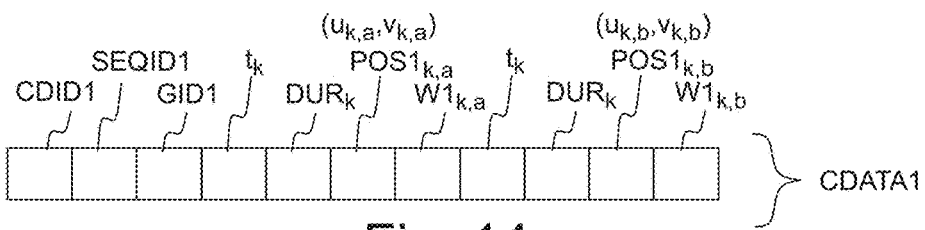
FIG. 14a shows, by way of example, control data which indicates positions for several primary portions for the same time interval.
Figure 14B:
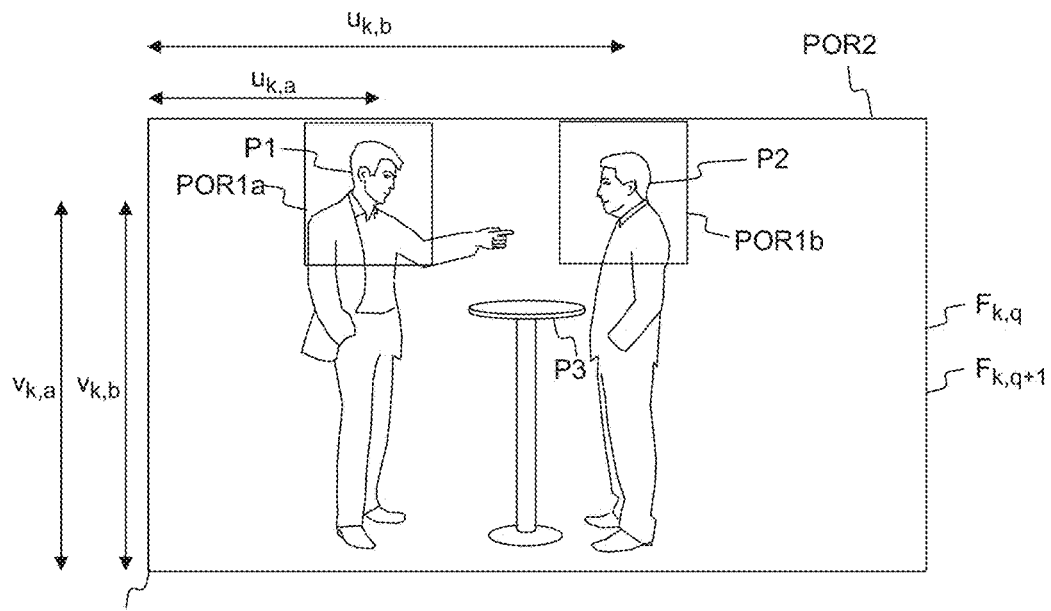
FIG. 14b shows, by way of example, a first primary portion and a second primary portion of an image frame.
Figure 14C:
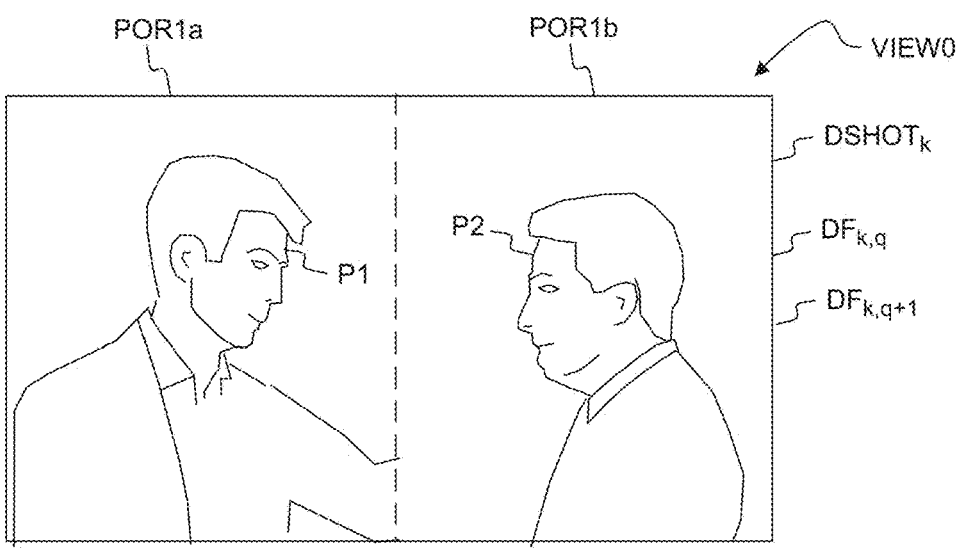
FIG. 14c shows, by way of example, a presentation image frame, which comprises the first primary portion and the second primary portion of FIG. 14b.

Referring to FIGS. 14a to 14c, a presentation image frame $DF_{k,q}$ and/or $DF_{k,q+1}$ of a presentation video shot $DSHOT_k$ may be formed from two or more primary portions POR1a, POR1b. The primary portions POR1a, POR1b may be combined such that the image information of the secondary portion POR2 is not shown in the presentation image frame $DF_{k,q}$, $DF_{k,q+1}$. The control data CDATA1 may indicate a first position $POS1_{k,a}$ of a first primary portion POR1a and a second position $POS1_{k,b}$ of a second primary portion POR1b to be used at the same time $t_k$. The position $POS1_{k,a}$ of the first primary portion POR1a may be indicated e.g. by providing coordinates $(u_{k,a}, v_{k,a})$. The position $POS1_{k,b}$ of the second primary portion POR1b may be indicated e.g. by providing coordinates $(u_{k,b}, v_{k,b})$. The first primary portion POR1a and the second primary portion POR1b may be portions of the same image frame (e.g. portions of the frame $F_{k,q+1}$).

The control data CDATA1 may optionally indicate the widths $w1_{k,a}$, $w1_{k,b}$ of the primary portions POR1a, POR1b.

The first primary portion POR1a may be a portion of an image frame of a first video sequence SEQ1, and the second primary portion POR1b may be a portion of an image frame of a second video sequence SEQ2.

For the multi-track case, the control data CDATA1 may comprise information about the order of priority of the video sequences SEQ1, SEQ2. The control data CDATA1 may indicate e.g. that the first video sequence SEQ1 has a first priority, a second video sequence SEQ2 has a second priority, and a third video SEQ3 sequence has a third priority. Thus, the display device 600 may still operate satisfactorily based on the control data CDATA1 also in a situation where one of the several video sequences SEQ1, SEQ2, SEQ3 is not available. For example, the control data CDATA1 may indicate that primary portions of image frames of the second video sequence SEQ2 should be displayed during a first time interval $\Delta t_k$, but it may happen that the video data VDATA2 of the second video sequence SEQ2 is not available. For example, the video data VDATA2 may be corrupted. Based on the priority order, the display 600 may show image frames of the first video sequence SEQ1 during the first time interval $\Delta t_k$. Based on the priority order, the display 600 may show image frames of the first video sequence SEQ1 during the first time interval $\Delta t_k$ instead of displaying an error message (e.g. "corrupted video data").

In an embodiment, a user may select the position of a primary portion e.g. by viewing the video sequence displayed on a touch screen, and by touching the screen in order to indicate the position of the primary portion. The video control data MRT may be generated and associated with the video sequence based on the detected touching point.

In an embodiment, the position of a primary portion may be determined e.g. by analyzing sharpness and/or brightness of image frames of a video sequence.

In an embodiment, the position of a primary portion may be determined e.g. by detecting movements of objects appearing in the video sequence.

In an embodiment, the position of a primary portion may be determined e.g. based on face detection or face recognition.

In an embodiment, the primary objects may be selected by a user. The user may watch the video sequences e.g. in slow motion, and he may select the primary objects e.g. by using a touch screen.

The control data may be generated by a method, which comprises:
  providing a group of video sequences, wherein the group comprises one or more video sequences,
  obtaining user input, which indicates which video sequence of said group is a primary video sequence for a temporal interval, and
  forming video control data based on the user input such that the video control data indicates which one of the video sequences of said group is a primary video sequence for said temporal interval.

The control data may be generated by a method, which comprises:
  providing a group of video sequences, wherein the group comprises a first video sequence and a second video sequence,
  obtaining user input, which indicates which one of the video sequences of said group is a primary video sequence for a temporal interval, and
  forming video control data based on the user input such that the video control data indicates which one of the video sequences of said group is a primary video sequence for said temporal interval.

A display device may be configured to:
  obtain a group of video sequences, wherein the group comprises a first video sequence and a second video sequence of the same event,
  obtain video control data, and
  display the selected video sequence according to the control data.

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

We claim:

1. A method, comprising:
  receiving a first video sequence captured by a first camera, the first video sequence comprising a plurality of image frames,
  receiving context data which comprises information about a location or orientation of the first camera, wherein the context data is related to the first video sequence,
  obtaining reference image data based on the context data,
  determining whether a first image frame of the first video sequence comprises an object of interest by comparing the first video sequence with the reference image data,
  in an instance in which the first image frame of the first video sequence comprises the object of interest, selecting a first position of an image portion of the first image frame substantially matching a position of an image of the object of interest,
  providing control data which indicates the first position, and
  generating a presentation video sequence from the first video sequence according to the control data.

2. The method of claim 1, comprising:
  detecting a geographical location of the first camera, and
  retrieving the reference image data based on the detected geographical location of the first camera.

3. The method of claim 1, comprising forming model data from the first video sequence, wherein said determining comprises comparing the model data with the reference image data.

4. The method of claim 3, wherein forming the model data from the first video sequence is based on a three-dimensional model.

5. The method of claim 1, comprising:
  receiving the first video sequence captured by the first camera,
  receiving a second video sequence captured by a second camera,
  providing context data indicative of a distance between the first camera and the second camera, and
  obtaining reference image data from the second video sequence if the context data indicative of the distance between the first camera and the second camera indicates that the distance between the first camera and the second camera is smaller than a predetermined limit, wherein said determining whether the first image frame of the first video sequence comprises a sub-image of the primary object comprises comparing the first video sequence with the reference image data.

6. The method according to claim 5, comprising:
  providing the second video sequence, the second video sequence comprising a second image frame,
  providing the control data, which indicates a position of a primary portion of the second image frame, the position of the primary portion of the second image frame being different from the first position of the primary image portion of the first image frame.

7. The method according to claim 6, comprising:
providing one or more audio signals,
forming audio control data based on the first position of the first primary image portion, and
providing the control data, which comprises the audio control data.

8. The method according to claim 7, wherein the first image frame is selected from among the image frames of the first video sequence based on analysis of second data, wherein said second data is selected from a group consisting of audio data, sensor data, context data, and second video data, wherein said second video data does not comprise said first video sequence.

9. The method of claim 1, wherein rendering the display further comprises utilizing runtime effects to display, from the image frame, only the primary image portion of the video sequence according to the control data.

10. The method of claim 1, wherein the control data further comprises information about an order of priority of the first video sequence based on whether the object of interest image appears, and wherein generating the presentation video from the first video sequence further comprises presenting the image frames comprising the object of interest based on the order of priority.

11. The method of claim 1, wherein the control data further comprises: data indicating a size of the object of interest, data indicating an aspect ratio of the object of interest, data for controlling sound effects, or data for controlling video effects.

12. An apparatus comprising at least one processor, and a memory including computer program code, the memory and the computer program code configured to, with the at least one processor, cause the apparatus to perform at least the following:
receive a first video sequence captured by a first camera, the first video sequence comprising a plurality of image frames,
receive context data which comprises information about a location or orientation of the first camera, wherein the context data is related to the first video sequence,
obtain reference image data based on the context data,
determine whether a first image frame of the first video sequence comprises an object of interest by comparing the first video sequence with the reference image data,
in an instance in which the first image frame of the first video sequence comprises the object of interest, select a first position of an image portion of the first image frame substantially matching a position of an image of the object of interest,
provide control data which indicates the first position, and
generate a presentation video sequence from the first video sequence according to the control data.

13. The apparatus of claim 12, being configured to:
detect a geographical location of the first camera, and
retrieve the reference image data based on the detected geographical location of the first camera.

14. The apparatus of claim 12, being configured to:
form model data from the first video sequence, and
perform said determining by comparing the model data with the reference image data.

15. The apparatus of claim 14, wherein forming the model data from the first video sequence is based on a three-dimensional model.

16. The apparatus according to claim 12, being configured to:
receive a second video sequence captured by a second camera, the second video sequence comprising a second image frame, and
provide the control data, which indicates a position of a primary portion of the second image frame, the position of the primary portion of the second image frame being spatially different from the first position of the primary image portion of the first image frame.

17. The apparatus according to claim 16, being configured to:
provide one or more audio signals,
form audio control data based on the first position of the first primary image portion, and
provide control the data, which comprises the audio control data.

18. The apparatus of claim 12, wherein the control data further comprises: data for indicating a size of the object of interest, data indicating an aspect ratio of the object of interest, data for controlling sound effects, or data for controlling video effects.

19. A computer program product embodied on a non-transitory computer readable medium, comprising computer program code configured to, when executed on at least one processor, cause an apparatus or a system to:
receive a first video sequence captured by a first camera, the first video sequence comprising a plurality of image frames,
receive context data which comprises information about a location or orientation of the first camera, wherein the context data is related to the first video sequence,
obtain reference image data based on the context data,
determine whether a first image frame of the first video sequence comprises an object of interest by comparing the first video sequence with the reference image data,
in an instance in which the first image frame of the first video sequence comprises the object of interest, select a first position of an image portion of the first image frame substantially matching a position of an image of the object of interest,
provide control data which indicates the first position, and
generate a presentation video sequence from the first video sequence according to the control data.

* * * * *